United States Patent
Li et al.

[11] Patent Number: 6,146,525
[45] Date of Patent: Nov. 14, 2000

[54] APPARATUS AND METHODS FOR SEPARATING PARTICULATES FROM A PARTICULATE SUSPENSION IN WASTEWATER PROCESSING AND CLEANING

[75] Inventors: Minhua Li; Zhaoyi Yang, both of Salt Lake City, Utah

[73] Assignee: Cycteck Environmental, Inc., Salt Lake City, Utah

[21] Appl. No.: 09/240,721
[22] Filed: Jan. 29, 1999

Related U.S. Application Data

[60] Provisional application No. 60/074,152, Feb. 9, 1998.
[51] Int. Cl.$^7$ .................. C02F 1/24; B01F 3/04; B01F 5/06
[52] U.S. Cl. .............. 210/221.2; 210/722; 210/758; 210/703; 210/205; 210/199; 210/206; 261/79.2; 261/122.1; 261/123; 261/124
[58] Field of Search ............. 261/124, 123, 261/122.1, 79.2; 209/170, 730; 210/221.2, 722, 758, 206, 703, 205, 199

[56] References Cited

U.S. PATENT DOCUMENTS

| | | |
|---|---|---|
| 4,279,743 | 7/1981 | Miller . |
| 4,397,741 | 8/1983 | Miller . |
| 4,399,027 | 8/1983 | Miller . |
| 4,744,890 | 5/1988 | Miller et al. . |
| 4,838,434 | 6/1989 | Miller et al. . |
| 4,997,549 | 3/1991 | Atwood . |

FOREIGN PATENT DOCUMENTS 3606747  9/1987  Germany .

*Primary Examiner*—Thomas M. Lithgow
*Attorney, Agent, or Firm*—Trask Britt

[57] ABSTRACT

Apparatus and methods for material separation consisting of a cyclone aerator which can enhance contact between contaminated water and air, or a oxidant gas, and can enhance the contact and attachment between particulates contained in the suspension and bubbles formed in the cyclone aerator. One embodiment comprises a plurality of plates positioned in a spaced relationship to one another within a jacketed tube. The plates are arranged in a distinct, non-radial orientation extending partially towards the center of the jacketing tube to define a cylindrical chamber within a center of the plates and an annular cylindrical chamber between the plates and the jacketing tube. A suspension is introduced into the cylindrical chamber tangentially through a feed line proximate or integral with a jacketing tube top of said jacketing tube to develop a swirling flow pattern of the suspension within the cylindrical chamber. Pressurized air is introduced through an air opening in the jacketing tube into the annular cylindrical chamber. The pressurized air travels between the adjacent plates, through the opening gaps between the adjacent plates, and into the cylindrical chamber,. When the pressurized air enters into the cylindrical chamber, it is sheared by the swirling flow pattern of the suspension to form fine air bubbles. Any particulates contained in the suspension will have organized collisions with fine air bubbles generated. These organized collisions result from the travel path of the swirling flow pattern of the suspension within the cylindrical chamber being close to orthogonal to any reference point where fine air bubbles are generated by the swirling flow pattern of the suspension. The organized orthogonal collisions result in an enhanced attachment of particulates within the suspension onto the air bubbles.

15 Claims, 10 Drawing Sheets

APPARATUS AND METHODS FOR SEPARATING PARTICULATES FROM A PARTICULATE SUSPENSION IN WASTEWATER PROCESSING AND CLEANING

RELATED APPLICATIONS

This application claims the benefit of U.S. Provisional Application No. 60/074,152, filed Feb. 9, 1998.

BACKGROUND OF THE INVENTION

1. Field of Invention

The present invention is directed to apparatus and methods for material separation. More particularly, the present invention is directed to apparatus and methods which are used for: a) separating either one type of particulate from another type of particulate or all particulates from a suspension consisting of water and various types of particulates; b) removing volatile organic compounds from a suspension consisting of the volatile organic compound and water; and c) achieving better dispersion and contact of an oxidant gas or gases with a suspension to achieve improved destruction of particulates, such as organic materials and the like, in the suspension.

2. State of the Art

The term "particulate" for purposes of this application is deemed to include any material (solid or liquid, organic or inorganic), particle-type, or particulate which is suspended in wastewater to be treated.

The term "suspension" for purposes of this application is deemed to include any liquid material (organic or inorganic) having particulates suspended therein.

Current growth in human population and industry has placed the wastewater treatment and processing as a top priority among environment concerns. This concern has spawned a variety of different types of technologies and equipment for treating wastewater generated from a variety of industrial activities.

For particulate removal, a significant portion in wastewater treatment is effected by dissolved air flotation (DAF) and induced air flotation (IAF) (collectively, "flotation separation techniques"). Such flotation separation techniques are particularly effective with particulates which are either naturally hydrophobic or can be rendered hydrophobic by chemicals/reagents before the wastewater is introduced into a DAF or IAF. After particulate removal, the treated water is monitored for pollution parameters, such as O&G (oil and grease) or FOG (fat, oil and grease), TSS (total suspended solids), BOD (bio-oxygen demand), and COD (chemical oxygen demand), before it is discharged into a local POTW (Publically Owned Treatment Works). Usually, a local POTW sets a standard for those parameters and a wastewater generator has to pay either a charge or a surcharge for any O&G, FOG, TSS, BOD, and COD discharged beyond those parameters, depending upon local water situations. Due to the growth of the population, as well as associated industrial activities, the standards that are dictated by local POTWs are expected to become more and more stringent.

Industries that generally require the use of flotation separation techniques for waste treatment include: slaughtering (animal kill), food production (meat processing facilities, bakeries, etc.), printing, textile production (particularly textile dying processes), chemical and petroleum production, metal fabrication, fleet automobile and truck maintenance/washing, and many others. Separation and concentration of particulates by flotation separation techniques have been a common practice in some of these industries. Particulates, either naturally hydrophobic or rendered hydrophobic by adsorption of a variety of reagents on their surfaces, can attach to the surface of dispersed air bubbles introduced into the suspension to form bubble/particulate aggregates. The bubble/particulate aggregates then float to the surface of the suspension to form a froth phase which can be separated from the suspension. The separation is generally accomplished by gravity and is not particularly effective. The simplified explanation for the poor efficiency is that collision events between bubbles and particles in the flotation separation techniques are rather random, hence the rate of attachment of particulates onto bubbles is slow. This results in the requirement of long retention times which, in turn, results in the necessity for large equipment size to achieve sufficient wastewater throughput. Thus, a significant capital investment for the industry generating the wastewater is necessary. Hence, an industry generating the wastewater may find it more economically feasible to pay fines and surcharges for the wastewater generated, rather than purchase the treatment equipment.

Various treatments are also known for the separation of different liquids from one another. Of particular concern is the removal of oils (the term "oil" includes hydrocarbon-containing materials from petroleum, animal, or plant sources) from various streams, such as from accidental oil spills on marine and inland waters, from steel mills and power plants, from ship ballast and bilge water, or from meat processing plants. The removal of oils is an extremely difficult task. Technologies used in oil removal from water mainly consist of two groups: gravity separation and flotation separation. The leading technology for the gravity separation is liquid/liquid cyclone technology, while the flotation separation includes DAF and IAF.

The separation of oil and water in liquid/liquid cyclones utilizes the density differences between water and oil. Liquid/liquid cyclones combine a high feed rate with small working floor space. However, for efficient separation, this technology requires an extremely high pumping pressure, because the density difference between water and oil is very small. The requirement of high pumping pressure results in a high equipment and operating costs. Further, it is well known that liquid/liquid cyclones cannot efficiently remove oil droplets which have a size of less 10 microns or when the oil has been emulsified in water. Furthermore, since hydrocarbon oils are hydrophobic in nature, flotation has also been successfully applied to the separation of oil from water. However, flotation technology has limited (low) processing capacity, resulting a high capital cost for equipment and building structures. Consequently, it is difficult to employ the conventional flotation technology to handle voluminous oil/water streams. Also, flotation technology cannot efficiently remove oil droplets which have a size of less 10 microns or if the oil has been emulsified in the water.

Many other types of small capacity oil/water separators are available in the market. However, these separators have a common flaw of only being viable if oil in water is not emulsified (i.e., the oil and water are in two separate liquid phases). More importantly, all of these separators perform the separation under a small flow rate, generally less than 10 gallons per minute, while occupying a large floor space.

Another problem in wastewater treatment is to remove volatile organic compounds (hereinafter "VOCs"), primarily from surface, ground or underground water. Halogenated hydrocarbons and numerous other organic compounds originating from agriculture and industry can be found in industrial wastewater and finished drinking waters. Furthermore, groundwater can become polluted with VOCs from underground tanks, surface chemical spills, and waste disposal sites.

The removal of VOCs from water has been practiced for many years. Direct sparging through water columns (bubble column aeration), packed towers, and a wide variety of specific designs combining different aeration techniques have been used. However, efficient processes which can be carried out in compact devices are in great demand.

If the solubility of a VOC to be removed is high, then its removal will be inefficient, even though it may be extremely volatile. However, if substantial air/water ratios are employed, the removal should be technically feasible. Nevertheless, conventional aeration machines do not operate properly at high air flow rates. Thus, VOC removal is usually accomplished with packed column air strippers. In conventional air strippers, mixing air and water is achieved by means of countercurrent flow of water and air. Contaminated water is introduced at the top of the air stripper and allowed to fall downward through a packed media (which serves to increase the contact surface area of water and increase the residence time of the contaminated water flowing down the air stripper). Clean air is blown through the bottom of the air stripper and travels upwards through the falling contaminated water. As a result, VOCs are stripped from the contaminated water and transferred into the air phase which is discharged at the top of the air stripper (in general, the removal rate of any VOC should be proportional to the airflow rate and Henry's law constant). The cleaned water is collected in a sump at the base of the air stripper and then discharged. The main disadvantage of conventional air strippers is their low specific processing capacity (i.e., processing capacity per unit volume of the air stripper). For example, a conventional air stripper will have a diameter as large as 10 feet, and have a height between about 15 to 25 feet. As a consequence, significant investment in equipment and building floor space is required. Furthermore, larger quantities of air may have to be employed for achieving the desired cleaning for less volatile compounds. In some cases, the presence of any dissolved ions, such as $Fe^{+2}$ and $Ca^{+2}$, as well as solid particles will adversely affect the stripping efficiency in the packed media within the air stripper by forming precipitates as a result of oxidation of these dissolved ions upon aeration (i.e., fouling of the packed media). As a consequence, frequent cleaning or replacement of the packing media is required, resulting a high operation cost. Furthermore, when the contaminated water contains a significant amount of solid particulates, processing by a conventional air stripper becomes even more difficult.

Apparatus which have been used for the various purposes recited above include those illustrated and described in the following U.S. Patents, which are hereby incorporated herein by reference:

U.S. Pat. 4,279,743 issued Jul. 21, 1981 to Jan D. Miller ("the '743 patent") relates to an air-sparged hydrocyclone which has a cylindrical section and a downwardly oriented conical section wherein a suspension is feed tangentially into a top portion of the cylinderical section to form a swirling flow path. A portion of the cylindrical section includes a porous wall wherein air is forced through the porous wall forming a plurality of air bubbles. The air bubbles disrupt a boundary layer in the swirling flow path, freeing entrapped fine particles and assist in carrying hydrophobic particles to a overflow line at the top of the hydrocyclone. The remainder of the suspension exits at a bottom portion of the hydrocyclone conical section.

U.S. Pat. 4,397,741 issued Aug. 9, 1983 to Jan D. Miller ("the '741 patent") relates to a gas-sparged hydrocyclone wherein a suspension is introduced into the hydrocyclone in a swirling vortex. A wash stream is introduced in a swirling vortex running countercurrent to and surrounding the suspension swirling vortex. Air is supplied either through a porous wall in the hydrocyclone or by means of air dispersed in the wash stream. The air assists in carrying hydrophobic particles to a sink discharge stream proximate an inlet for the suspension. The reminder of the suspension exits at a bottom portion of the hydroclone.

U.S. Pat. 4,399,027 issued Aug. 16, 1983 to Jan D. Miller ("the '027 patent") relates to a vertically oriented hydrocyclone having a tangential inlet proximate a top portion of the hydrocyclone and a tangential outlet proximate a bottom portion of the hydrocyclone. A suspension is introduced into the hydrocyclone through the tangential inlet to form a swirling vortex. Air is supplied through a porous wall about the periphery of the hydrocyclone to form air bubbles. The air bubbles contact particulates in the suspension stream to form bubble/particulate aggregate which migrates toward the axial center of the hydrocyclone and floats upward to be discharged from an exit line. The remainder of the suspension exits through the tangential outlet.

U.S. Pat. 4,744,890 issued May 17, 1988 to Jan D. Miller and David J. Kinneberg ("the '890 patent") and U.S. Pat. 4,838,434 issued Jun. 13, 1989 to Jan D. Miller and Ye Yi ("the '434 patent") each relate to a vertically oriented hydrocyclone having a tangential inlet proximate a top portion of the hydrocyclone and an annular outlet proximate a bottom portion of the hydrocyclone. A suspension is introduced into the hydrocyclone through the tangential inlet to form a swirling vortex. Air is supplied through a porous wall about the periphery of the hydrocyclone to form air bubbles. The air bubbles contact particulates in the suspension stream to form bubble/particulate aggregate which migrates in a froth column toward the axial center of the hydrocyclone and floats upward to be discharged from an exit line. The remainder of the suspension exits through the annular outlet which forms about a pedestal at the bottom of the hydrocyclone. The pedestal (cyclindrical in the '890 patent and substantially conical in the '434 patent) serves to support the froth column and minimize mixing between the froth column and the remainder of the suspension.

U.S. Pat. 4,997,549 issued Mar. 5, 1991 to Ronald Atwood ("the '549 patent") relates to a vertically oriented hydrocyclone having a tangential inlet proximate a top portion of the hydrocyclone and a tangential outlet proximate a bottom portion of the hydrocyclone. A suspension is introduced into the hydrocyclone through the tangential inlet to form a swirling vortex. Air is supplied through a porous wall about the periphery of the hydrocyclone to form air bubbles. The air bubbles contact particulates in the suspension stream to form bubble/particulate aggregate which migrates as a froth column toward the axial center of the hydrocyclone and float upward to be discharged from an exit line. A froth washing tube runs from the bottom of the hydrocyclone to the exit line at substantially the axial center of the hydrocyclone with an opening and a deflector proximate the exit line wherein water is discharged from the froth washing tube in a radial direction to pass through the froth column to remove any hydrophillic particles entrained in the froth column. The remainder of the suspension exits through the tangential outlet.

From the point of practical consideration, the devices described in these prior art patents have certain problems in application. First, to achieve and develop a froth column, as well as to maintain a well-defined, swirling vortex of a desired thickness, a high air to suspension ratio (on a volume basis) has to be used so that a froth phase is formed in the center and removed from the top of the vortex through an exit line. Such high air to suspension ratios might be applicable for mining applications; however, wastewater applications pose different problems.

Most wastewater contains a significant amount of surfactant, such as soap or detergent from washing and cleaning activities. If the prior art designs were used with wastewater containing such surfactants, the devices would create a foam phase that is difficult to control and special defoaming tanks or reagents might be needed. Second, to achieve desired separation in the devices of the prior art patent, many control parameters, such as equipment dimensions/size ratios and flow rates and pressures of the liquid feed and the gas feed, have to be considered. These control parameters are so situation-oriented that they have to be tested and determined for each particular application and the adjustable parameters have to be continuously adjusted during operation to compensate for changing conditions. Third, the use of a porous walls often results in plugging by particulates contained in the suspension. Force decomposition and motion analysis for a particulate contained in the suspension under tangential flow conditions reveals that a particulate has a force directed radially outward and perpendicular to pore openings on inner surface wall of the porous wall due to the curvature of the hydrocyclone (used to create and maintain the tangential flow). It is this force and motion from the particulates which results in the plugging of the particulates in the pores openings of the porous wall. Plugging of the porous wall can result in decreased efficiencies of a) bubble generation, b) collision between air bubbles and particulates, and c) attachment of particulates onto the air bubbles. Once plugged, the porous wall usually must be replaced.

Thus, it can be appreciated that it would be advantageous to develop a wastewater treatment apparatus and technique which would be applicable in a variety of treatment situations without or with minimal need for modification of the apparatus for differing situations and which would eliminate or minimize the potential of plugging of air inlets of the apparatus.

SUMMARY OF THE INVENTION

The present invention combines both froth flotation principles with the flow characteristics of a cyclone aerator into a compact and portable piece of equipment for efficient removal of particulates from water, oil/fuel (especially emulsified oil/fuel) from water, volatile organic chemicals from water, and disbursement of particulate destroying oxidants into a liquid. Further, the apparatus of the present invention accomplishes these results without any substantial plugging problems and with the capability of easy cleaning in the event of plugging or contamination.

The apparatus and methods of the instant invention consist of a specially designed devise which enhances the contact between water and air, or oxidant gas, and enhance the collision/contact and attachment between particulates contained in the suspension and air bubbles formed in the devise. The apparatus and methods also consist of specially designed tanks for the separation of bubbles which are loaded either with particles or volatile organic compounds from the suspension.

One embodiment of a cyclone aerator of the present invention comprises a plurality of vanes or plates disposed within a generally vertically oriented jacketing tube. The plurality of plates are positioned in the jacketing tube to substantially extend from a top to a bottom of the jacketing tube. The plurality of plates are also positioned in a spaced relationship to one another wherein the plates extend partially towards the center of the jacketing tube to define a cylindrical chamber within a center of the plates and to define an annular cylindrical chamber between the plates and the jacketing tube. The plurality of plates are arranged in a distinct, non-radial orientation that is determined by a radius of the cylindrical chamber, a radius from the centerline of the cylindrical chamber to an outer edge of the plates, and an angle defined as the angle between a radial line from the centerline of the cylindrical and the planar position of each of the plurality of plates. These three parameters are used to determine the appropriate numbers of plates to be used in the cyclone aerator, as well as an opening gap between each adjacent plate, as set forth in the following equations:

$$N = \frac{C}{(T/(2 \cdot \cos\alpha)) + G}$$

$$R_2 = \frac{Lp \cdot \sin\alpha \cdot (L-1)}{Lp \cdot \sin\alpha - L \cdot \tan\alpha}$$

where: N is the number of plates

C is $2 \cdot \pi \cdot R_2$

T is the thickness $\alpha$ is the angle selected

G is the gap between two plates

R1 is the desired radius of the cylindrical chamber

R2 is the desired radius from the center line to the outer edge of a plate

Lp is the plate width

L is R1–R2

A suspension is introduced into the cylindrical chamber tangentially through a feed line proximate or integral with a top cover of said jacketing tube to develop a swirling flow pattern of the suspension within the cylindrical chamber. Pressurized air is introduced through an air opening in the jacketing tube, preferably near a midpoint of the jacketing tube, into the annular cylindrical chamber. From the annular cylindrical chamber, the pressurized air travels between the adjacent plates, through the opening gaps between the adjacent plates, and into the cylindrical chamber. When the pressurized air enters into the cylindrical chamber, it is sheared by the swirling flow pattern of the suspension to form fine air bubbles. Any particulates contained in the suspension will have organized collisions with fine air bubbles generated. These organized collisions result from the travel path of the swirling flow pattern of the suspension within the cylindrical chamber being close to orthogonal to any reference point where fine air bubbles are generated by the swirling flow pattern of the suspension. Such organized orthogonal collisions result in attachment of particulates within the suspension, which are either naturally hydrophobic or have been rendered hydrophobic by chemical reagents prior to being introduced into the cyclone aerator, onto air bubbles. The suspension travels the length of the cyclone aerator and exits through a discharge opening proximate a bottom of the cyclone aerator. Once the particulates in the suspension are attached to the air bubbles, the particulates can be easily separated from the remaining suspension.

The cyclone aerator eliminates or minimizes the potential of plugging in the opening gaps between the adjacent plates due to the fact that the opening gaps that provides the initial air flow direction has an angle as compared with the radial force of the particle which direction is radially out and is also perpendicularly acting at the curvature created by the plates. However, due to this angle, a particle will not pressure itself into the gap between two plates which prevents plugging. Furthermore, during operation, the plates vibrate which removes any particles plugged in the opening gaps. Moreover, even if plugging does occur, the plates can be easily removed, cleaned, and reassembled into the cyclone aerator.

Thus, this embodiment establishes a controlled, high force swirling flow pattern of the suspension which increases the inertia of fine particulates and produces a high density of small air bubbles with a directed motion to improve bubble/particle collision efficiency. Furthermore, this embodiment, in conjunction with chemicals to render the particulates hydrophobic (if needed) for better attachment onto the air bubbles, and in conjunction with flotation separation tank, provides an efficient way to remove particulates that have collided and attached onto air bubbles. The net result is effective particulate flotation in a flotation separation tank with a flotation separation rate having retention times which approach intrinsic particulate/air bubble attachment times. Thus, the present invention can replace current DAF equipment and yield enhanced separation and removal efficiency for particulates from a suspension.

Another embodiment of a cyclone aerator according to the present invention comprises a cyclone aerator virtually identical to the cyclone aerator described above; however, a porous hollow cylinder is disposed within the cylindrical chamber formed by the plurality of plates. A second flow of pressurized air is introduced into an interior chamber of the porous hollow cylinder. As the second flow of pressurized air through the porous hollow cylinder exits the porous hollow cylinder, it is also sheared into fine air bubbles by the swirling flow pattern of the suspension. The porous hollow cylinder serves two purposes. First, it assists in maintaining a more cohesive swirling flow pattern. Second, air bubbles generated from the porous hollow cylinder will participate in the collision of particulates in the suspension with air bubbles thereby attaching particulates to the air bubbles. Furthermore, rather than using a porous hollow cylinder, a solid (or solid walled) cylinder can be used. This will result in a more cohesive swirling flow pattern without the introduction of the second flow of pressurized air.

The present invention also includes a novel flotation tank for use with a cyclone aerator, wherein the cyclone aerator is submerged under a suspension pool within the tank. A feed suspension is delivered to the cyclone aerator proximate an upper portion of the cyclone aerator. A first pressurized air strength is delivered to the cyclone aerator proximate the middle of the cyclone aerator. An air/suspension mixture exits the bottom of the cyclone aerator into the suspension pool. Preferably, the cyclone aerator includes a flow director at the bottom of the cyclone aerator which deflects the air/suspension mixture in a more radial direction from the cyclone aerator.

The air/suspension mixture is directed out of the cyclone aerator into different flow patterns that are controlled by the shape of the tank. Particulates that are attached onto air bubbles (hereinafter "particulated air bubbles") are discharged out of the cyclone aerator, wherein the particulated air bubbles comprise between about 10 and 30% of the total suspension discharged from the cyclone aerator. A portion of the particulated air bubbles are discharged from the cyclone aerator into the suspension pool or will first contact a tank wall, then rise to the top of the tank. However, a majority of the discharged suspension is particulate-free and will create fluid motion at the bottom portions of the tank which results in "stirring-up" of particulates that were not attached to bubbles or became detached from air bubbles and which have settled to the bottom portions of the tank. This "stiring-up" can result in secondary attachment to bubbles in the suspension pool with results in improve particulate removal. The particulated air bubbles, after rising to the top of the tank, form what is known at the "froth product phase". The froth product phase can then be removed by any other conventional means, such as skimming, thereby removing the particulates.

The tank also includes a discharge structure attached to a tank wall, which is used for discharging the particulate-free portion of the suspension from the tank. The discharge structure is essentially a substantially a rectangular box without the top cover. The portion of the suspension which is substantially free of particulates follows a flow path through a top portion of the discharge structure, through an opening in a tank sidewall, and into a first chamber. From the first chamber, the particulate-free portion of the suspension flows over the weir into a second chamber. From the second chamber, the particulate-free portion of the suspension can be either discharged through opening, or pumped out for the second stage processing, depending on the characteristics of the particulate-free portion of the suspension to be processed.

It is, of course, known that in many wastewater treatment situations, chemicals are needed to render the particulates contained in the suspension hydrophobic so that they can be attached onto air bubbles generated in any separating device. Thus, a variety of configurations of in-line mixers for addition of chemicals and conditioning tanks can be utilized with the present invention to achieve the desired particulate removal.

Yet another embodiment of present invention relates to a stripping device for the removal of volatile organic compounds ("VOCs"). The VOC stripping device basically comprises two cyclone aerators, as discussed above, placed head to head in a horizontal position with a common suspension feed. In particular, the VOC stripping device comprises a plurality of plates disposed within a jacketing tube. The plurality of plates in conjunction with the jacketing tube define an annular cylindrical chamber therebetween. The plurality of plates also define a cylindrical chamber, substantially along a centerline of the VOC stripping device. A porous hollow cylinder is can be disposed in the cylindrical chamber. The plurality of plates are arranged in the distinct, non-radial orientation discussed above.

A suspension is introduced into the cylindrical chamber tangentially through a feed line proximate a midpoint of said jacketing tube to develop two swirling flow patterns of the suspension which flow in opposite directions within the cylindrical chamber on the outside of the porous hollow cylinder. A first flow of pressurized air is introduced through a first air opening in the jacketing tube into the annular cylindrical chamber proximate the midpoint between the feed line and a first suspension discharge line. A second flow of pressurized air is introduced through a second air opening in the jacketing tube into the annular cylindrical chamber proximate the midpoint between the feed line and a second suspension discharge line. The first and second flows of pressurized air travel into the cylindrical chamber through the opening gaps between the adjacent plates where they are sheared by the swirling flow pattern of the suspension to form fine air bubbles. The formation of fine air bubbles in such a manner provides an optimal interfacial contact between the fine air bubbles and the suspension. This optimal interfacial contact significantly improves the mass transfer of any substance between the air and the suspension. In the case of VOCs, the VOC stripping device creates a mass transfer of VOC from the suspension into the fine air bubble due to the chemical potential difference of a VOC between two phases.

A third flow of pressurized air is introduced into the porous hollow cylinder proximate the first suspension discharge line. A fourth flow of pressurized air is introduced into porous hollow cylinder proximate the second suspension discharge line. The third and fourth flow of pressurized air passes through the porous hollow cylinder into the swirling flow pattern of the suspension. As the third and fourth flows of pressurized air exit the porous hollow cylinder, they are also sheared into fine air bubbles by the swirling flow pattern of the suspension. The porous hollow cylinder serves two purposes. First, the porous hollow cylinder assists in maintain a more cohesive swirling flow pattern. Second, air bubbles generated from the porous hollow cylinder will participate in the mass transfer of the VOCs out of the suspension into the fine air bubbles. As a result of the intimate interaction between these numerous fine bubbles and the suspension, the VOCs in the water are stripped and transferred into the fine air bubbles.

The first and second suspension discharge lines are connected to a first and second air/water separators, respectively. The suspension which is now substantially free of VOCs is discharged out of the first and second air/water separators through first and second suspension discharge lines, respectively. The air which contains the VOCs is pumped out of the first and second air/water separators through first and second air discharge lines, respectively, and through a carbon canister. The carbon canister removes the VOCs from the air before discharging clean air to the atmosphere.

The VOC stripping device of the present invention achieves both a high throughput and a high volatile matter removal efficiency, and requires a working space far less than packed-column and/or mechanical surface aeration, or any other aeration techniques. The compactness, portability, and throughput of the VOC stripping device of the present invention can also provide rapid separation of volatile organic contaminants from large water streams for emergency pollution situations, particularly the treatment of contaminated drinking water, ground waters, or spill of industrial waste streams.

In still another embodiment, the cyclone aerators and the VOC stripping device of the present invention each can be used to transfer gaseous chemicals from a gas to the suspension, since the mass transfer between air phase and water phase can be reversed due to a difference in chemical potential. The devices, thus, act as diffusers or chemical reactors.

For example, an oxidation gas can be introduced with or in lieu of the pressurized air which is introduced into these devices to create an appropriate mass transfer of the oxidation gas contained in air phase into the suspension phase. An oxidation gas such as ozone, which is very effective in destroying bacteria, viruses, and other organic materials in water, has not been widely utilized in industry because most of the ozone gas which is introduced into the water together with air, as the parent gas phase, cannot transfer into the water quickly (as it is with most gases). In fact, although ozone has about a 1.5 times stronger oxidization ability than chlorine, can react up to 3,000 times faster than chlorine with organic materials, and produces no harmful decomposition products, it is only slightly soluble in water, at about 0.88 volumes of ozone per 100 volumes of the water. This translates into only several parts per million by weight transferred into the water. Further, the solubility of the ozone decreases as the temperature of the water to be treated increases. However, with the devices of the present invention, the generation of numerous fine air bubbles by the shear motion of the suspension creates for a large interfacial area between air and water for any given volume ratio between air and suspension. Thus, the mass transfer of the ozone from air into the water is significantly improved. This improved ozone uptake in the suspension by the utilization of the devices of the present invention can provide an effective disinfecting effect, while reducing to a minimum the consumption of the ozone per volume of the water, as there is minimum waste of the ozone after air bubbles separate with the water phase.

BRIEF DESCRIPTION OF THE DRAWINGS

While the specification concludes with claims particularly pointing out and distinctly claiming that which is regarded as the present invention, the advantages of this invention can be more readily ascertained from the following description of the invention when read in conjunction with the accompanying drawings in which:

DETAILED DESCRIPTION OF PREFERRED EMBODIMENTS

FIGS. 1–12 illustrate various views of cyclone aerators, flotation tanks, and volatile organic chemical stripping devices. It should be understood that the figures presented in conjunction with this description are not meant to be illustrative of actual views of any particular apparatus, but are merely idealized representations which are employed to more clearly and fully depict the present invention than would otherwise be possible. Elements common between the figures retain the same numeric designations.

Figure 1:
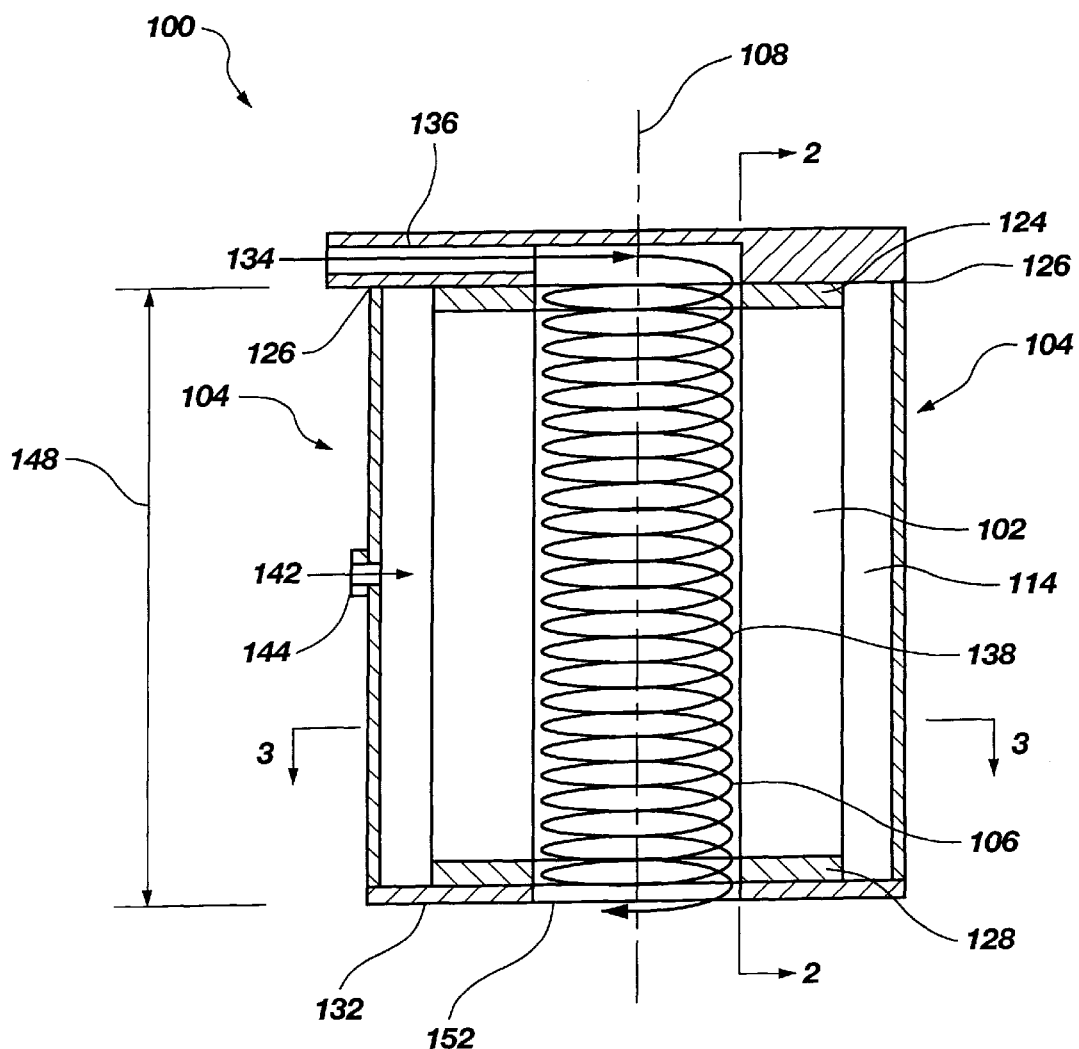
FIGS. 1–3 are a cross-sectional views of one embodiment of a cyclone aerator according to the present invention.
Figure 2:
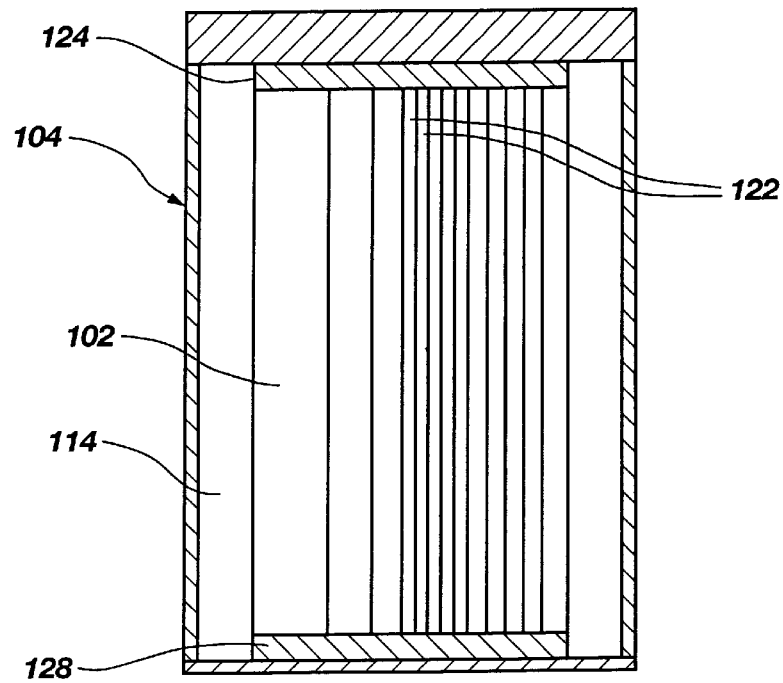
Figure 3:
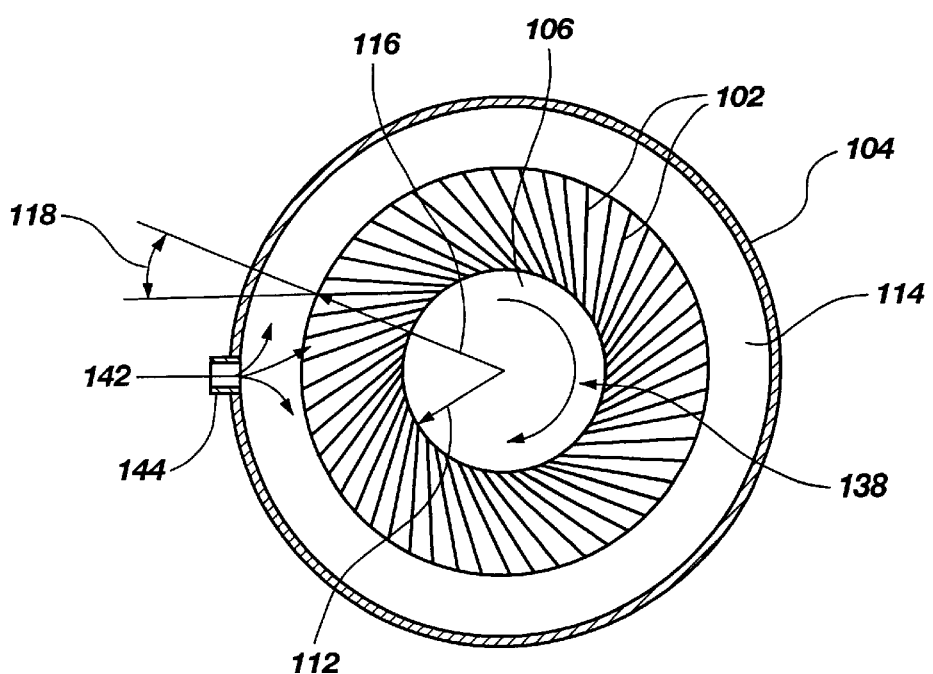

FIGS. 1–3 illustrate a cyclone aerator 100 of the present invention comprising a plurality of plates 102 disposed within a jacketing tube 104. The plurality of plates 102 define a cylindrical chamber 106 (see FIG. 3), having a first radius 112, substantially along a centerline 108 (see FIG. 1) of the cyclone aerator 100. The plurality of plates 102 in conjunction with the jacketing tube 104 define an annular cylindrical chamber 114 therebetween. The plurality of plates 102 are arranged in a distinct, non-radial fashion that is determined by the first radius 112, a second radius 116

(distance from the centerline 108 to an outer edge of the plates 102—FIG. 3), and a first angle 118, defined as the angle between a radial line from the center line 108 and the planar position of each of the plurality of plates 102. These three parameters (i.e., the first radius 112, the second radius 116, and the first angle 118) are used to determine the appropriate numbers of plates 102 to be used in the cyclone aerator 100, as well as an opening gap 122 (see FIG. 2) between each adjacent plate 102, as follows:

$$N = \frac{C}{(T/(2 \cdot \cos\alpha)) + G}$$

$$R_2 = \frac{Lp \cdot \sin\alpha \cdot (L-1)}{Lp \cdot \sin\alpha - L \cdot \tan\alpha}$$

where: N is the number of plates
C is $2 \cdot \pi \cdot R_2$
T is the thickness
α is the angle selected
G is the gap between two plates
R1 is the desired radius of the cylindrical chamber
R2 is the desired radius from the center line to the outer edge of a plate
Lp is the plate width
L is R1–R2

The plurality of plates 102 are preferably confined in an jacketing tube 104 by top flanges 124 in a top cover 126 and bottom flanges 128 in a jacketing tube bottom 132.

Figure 6:
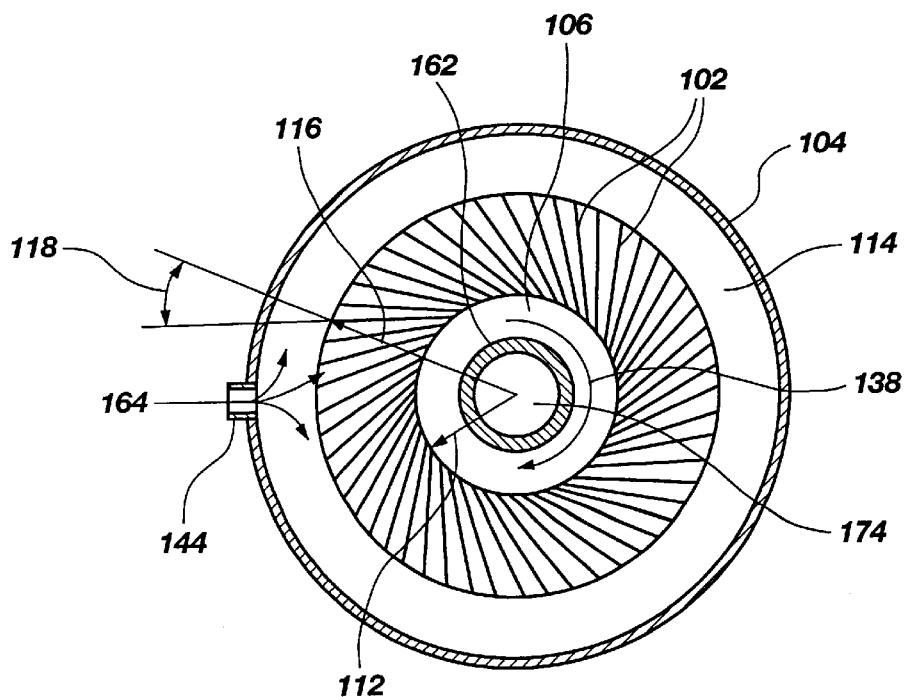

A suspension 134 is introduced into the cylindrical chamber 106 tangentially through a feed line 136 proximate or integral with a top cover 126 of said jacketing tube 104 to develop a swirling flow pattern 138 of the suspension 134 within the cylindrical chamber 106, as shown in FIG. 3. Pressurized air 142, preferably between about 5 and 10 psig, is introduced through an air opening 144 in the jacketing tube 104 into the annular cylindrical chamber 114. The pressurized air 142 travels between the adjacent plates 102, through the opening gaps 122 between the adjacent plates 102, and into the cylindrical chamber 106. When the pressurized air 142 enters into the cylindrical chamber 106, it is sheared by the swirling flow pattern 138 of the suspension 134 to form fine air bubbles. The size and number of the fine bubbles is controlled by a variety of parameters, including but not limited to the first radius 112, the second radius 116, the first angle 118, a length 148 of the jacketing tube 104, a tangential velocity of the suspension 134 introduced into the cylindrical chamber 106, and the flow rate ratio between the pressured air 142 and the suspension 134.

Any particulates contained in the suspension 134 will have organized collisions with the fine air bubbles generated. These organized collisions result from the travel path of the swirling flow pattern 138 of the suspension 134 within the cylindrical chamber 106 being close to orthogonal to any reference point where fine air bubbles are generated by the swirling flow pattern 138 of the suspension 134. Such organized orthogonal collisions result in attachment of particulates, which are either naturally hydrophobic or have been rendered hydrophobic by chemical reagents prior to being introduced into the cyclone aerator 100, onto air bubbles. The suspension 134 travels the length 148 of the cyclone aerator 100 and exits through a discharge opening 152. Once the particulates in the suspension 134 are attached to the air bubbles, the particulates can be easily separated from the remaining suspension 134.

The cyclone aerator 100 eliminates or minimizes the potential of plugging in the opening gaps 122 between the adjacent plates 102 due to the fact that the opening gaps 122 that provides the initial air flow direction has an angle as compared with the force of the particle which direction is also radially out and is also perpendicularly acting at the curvature created by the plates 102. However, due to this angle, a particle will not pressure itself into the gap between two plates which prevents plugging. Furthermore, during operation the plates 102 vibrate which removes any particles plugged in the opening gaps. Moreover, even if plugging does occur, the plates 102 can be easily removed, cleaned and reassembled into the cyclone aerator 100.

FIGS. 4–6 illustrate another embodiment of a cyclone aerator 160 according to the present invention. The cyclone aerator 160 is similar to cyclone aerator 100 illustrated in FIGS. 1–3. The cyclone aerator 160 comprises a plurality of plates 102 disposed within a jacketing tube 104. The plurality of plates 102 in conjunction with the jacketing tube 104 define an annular cylindrical chamber 114 therebetween. The plurality of plates 102 define a cylindrical chamber 106, having a first radius 112, substantially along a centerline 108 of the cyclone aerator 100. A porous hollow cylinder 162 is disposed in the cylindrical chamber 106. The porous hollow cylinder may be made of porous stainless steel, ceramic material, or polyethylene with pores sizes between about 5 and 250 microns.

Again, the plurality of plates 102 are arranged in a distinct, non-radial fashion that is determined by the first radius 112, a second radius 116 (distance from the centerline 108 to an outer edge of the plates 102), and a first angle 118, defined as the angle between a radial line from the center line 108 and the planar position of each of the plurality of plates 102. These three parameters (i.e., the first radius 112, the second radius 116, and the first angle 118) are used to determine the appropriate numbers of plates 102 to be used in the cyclone aerator 100, as well as an opening gap 122 between each adjacent plate 102. The plurality of plates 102 are preferably confined in an jacketing tube 104 by top flanges 124 in a jacketing tube top 126 and bottom flanges 128 in a jacketing tube bottom 132.

A suspension 134 is introduced into the cylindrical chamber 106 tangentially through a feed line 136 proximate a top cover 126 of said jacketing tube 104 to develop a swirling flow pattern 138 of the suspension 134 within the cylindrical chamber 106 on the outside of the porous hollow cylinder 162, as shown in FIG. 5. A first flow of pressurized air 164 is introduced through an air opening 144 in the jacketing tube 104 into the annular cylindrical chamber 114. The first flow of pressurized air 164 travels through the opening gaps 122 between the adjacent plates 102 and into the cylindrical chamber 106. When the first flow of pressurized air 164 enters into the cylindrical chamber 106, it is sheared by the swirling flow pattern 138 of the suspension 134 to form fine air bubbles.

Any particulates contained in the suspension 134 will have organized collisions with fine air bubbles generated. These organized collisions result from the travel path of the swirling flow pattern 138 of the suspension 134 within the cylindrical chamber 106 being close to orthogonal to any reference point where fine air bubbles are generated by the swirling flow pattern 138 of the suspension 134. Such organized orthogonal collisions result in attachment of particulates, which are either naturally hydrophobic or have been rendered hydrophobic by chemical reagents prior to being introduced into the cyclone aerator 100, onto the air bubbles.

A second flow of pressurized air 166 is introduced into an interior chamber 174 of the porous hollow cylinder 162 (see FIG. 6). As the second flow of pressurized air 166 passes through the porous hollow cylinder 162, it is also sheared into fine air bubbles by the swirling flow pattern 138 of the suspension 134. The porous hollow cylinder 162 serves two purposes. First, the porous hollow cylinder 162 assists in maintaining a more cohesive swirling flow pattern 138. Second, air bubbles generated from the porous hollow cylinder 162 will participate in the collision of particulates in the suspension 134 with air bubbles, thereby attaching particulates to the air bubbles.

The suspension 134 travels the length 148 of the cyclone aerator 160 and exits through a discharge opening 152. Once the particulates in the suspension 134 are attached to the air bubbles, the particulates can be easily separated from the remaining suspension 134.

Figure 4:
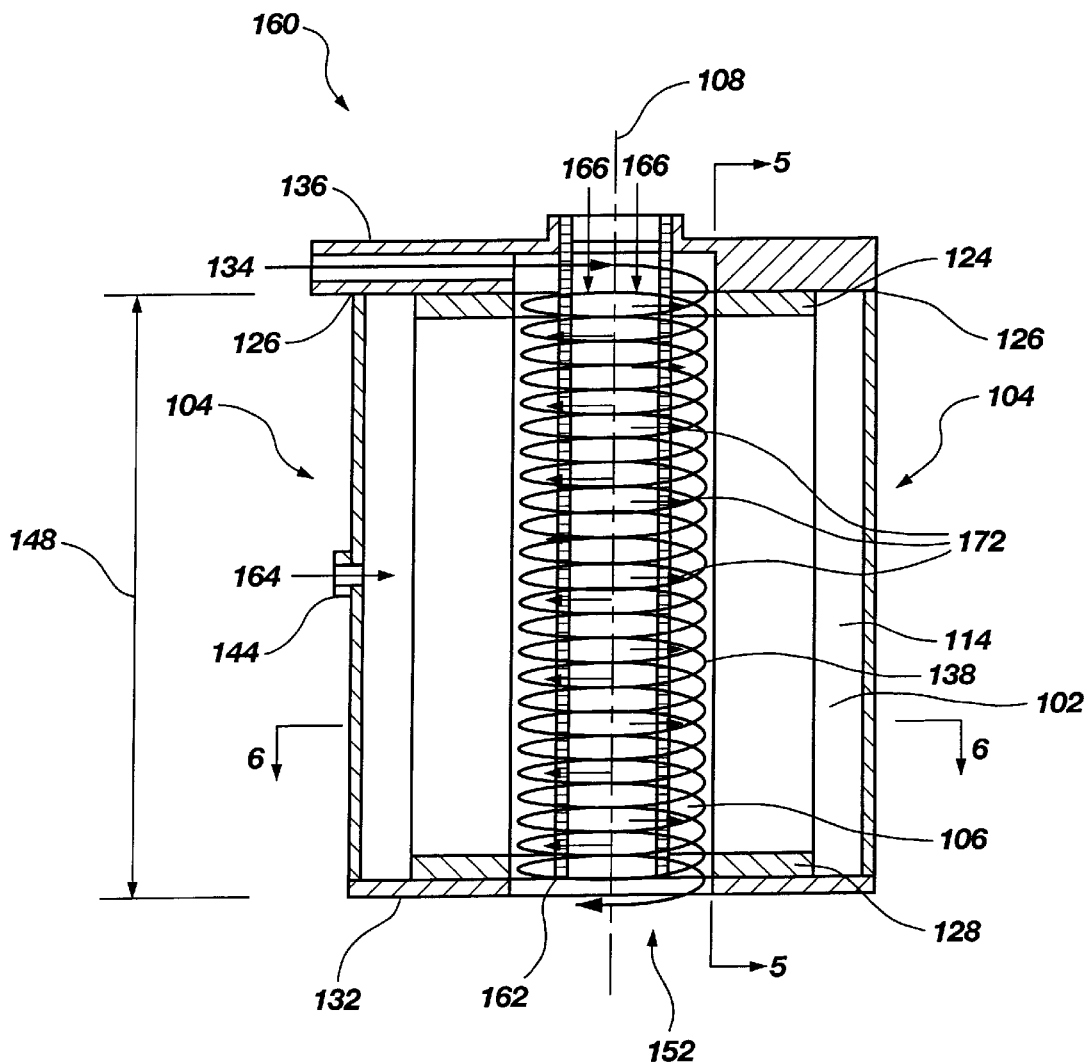
FIGS. 4–6 are a cross-sectional views of another embodiment of a cyclone aerator according to the present invention.
Figure 5:
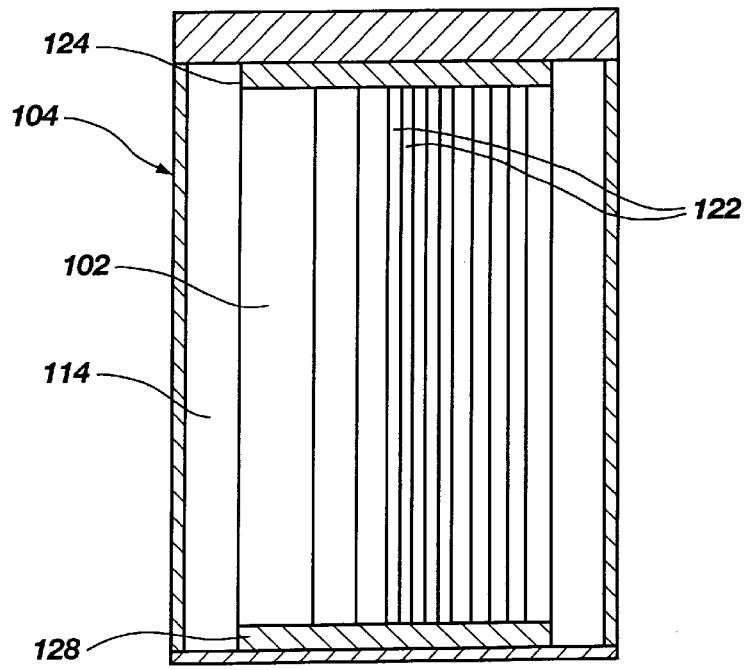
Figure 7:
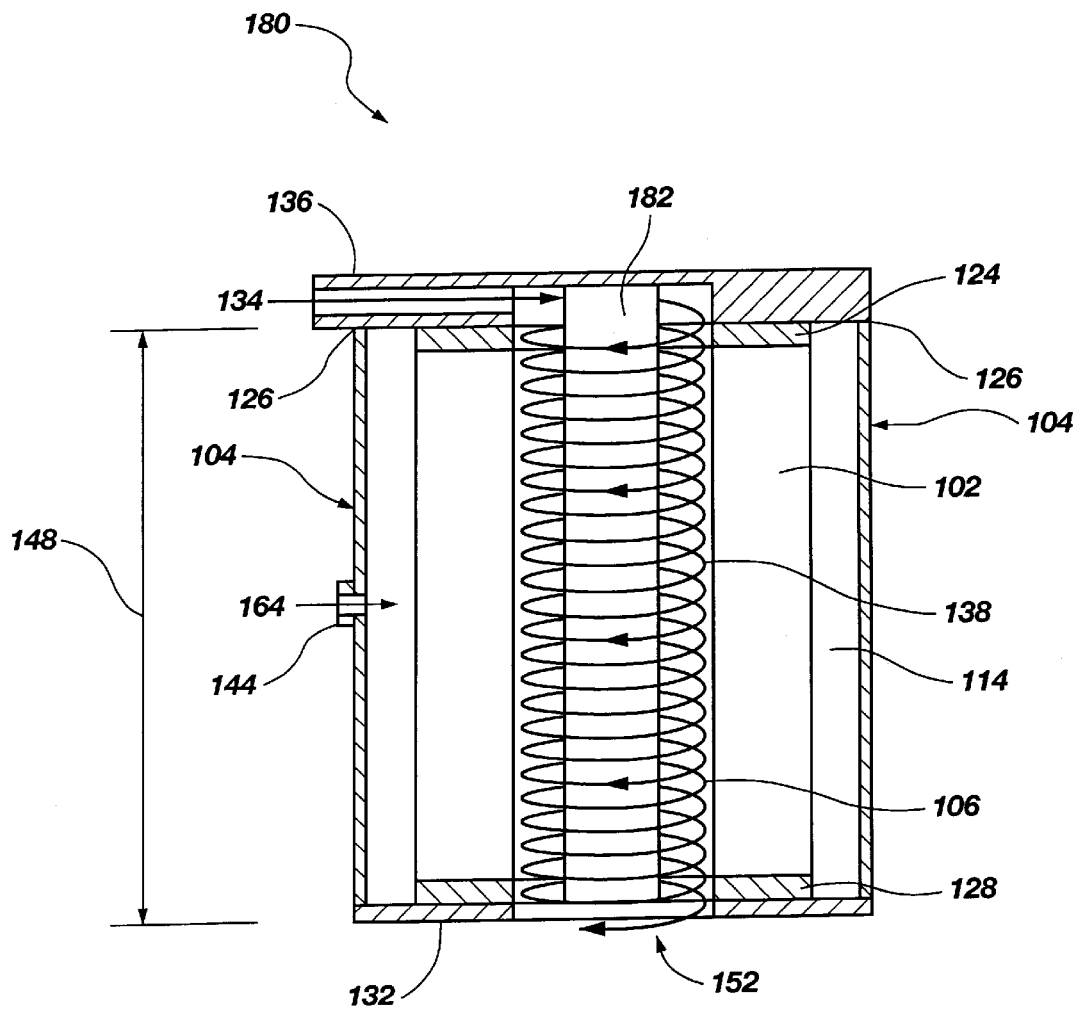
FIG. 7 is a cross-sectional view of yet another embodiment of a cyclone aerator according to the present invention.

If is, of course, understood that a solid or solid-walled cylinder 182 can be used rather than a porous hollow cylinder 162 to form a cyclone aerator 180, as shown in FIG. 7. The use of a solid cylinder 182 will result in a more cohesive swirling flow pattern 138 without the introduction of the second flow of pressurized air 166 (as shown in FIG. 4).

Figure 8:
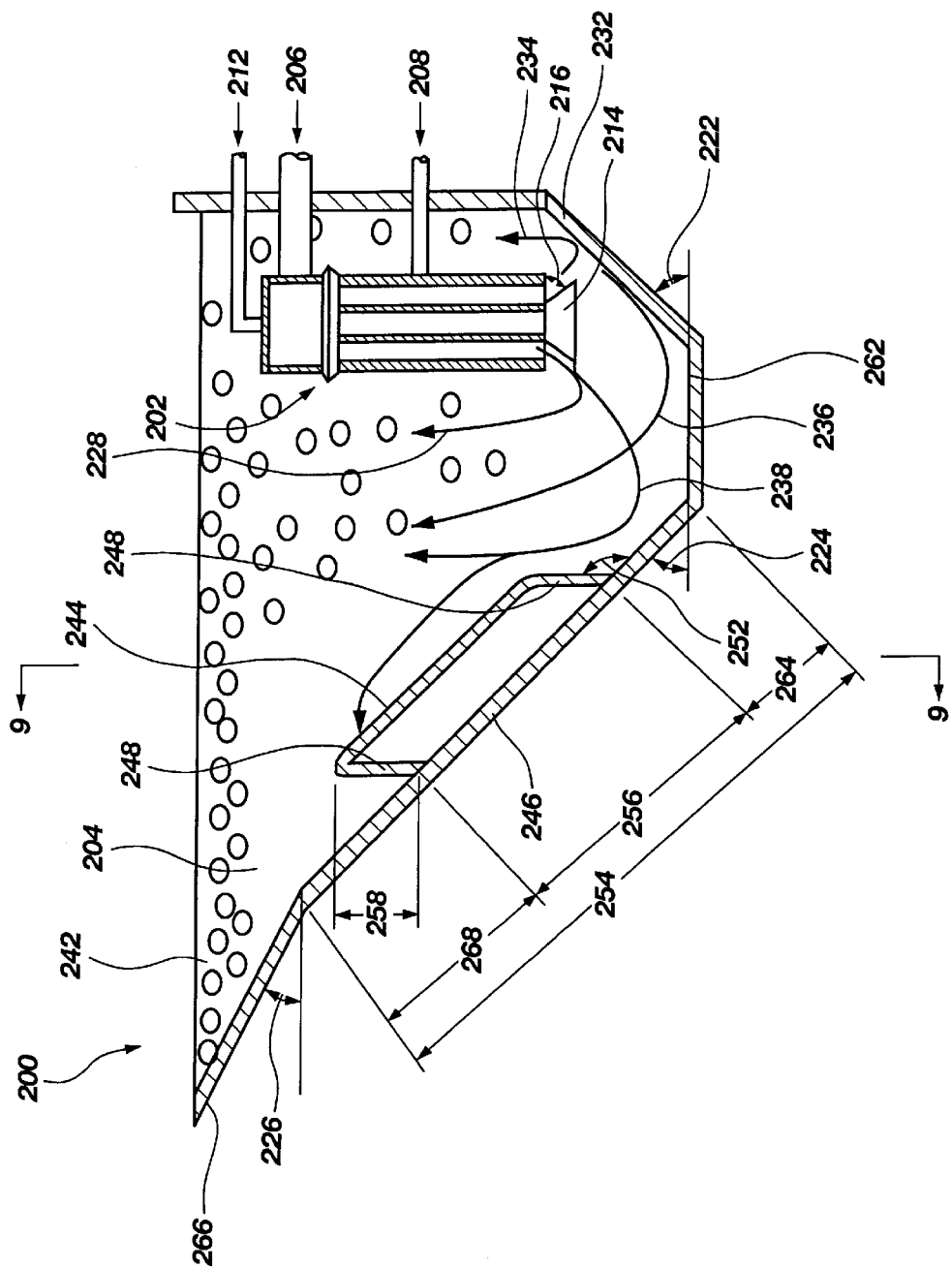
FIG. 8 is a cross-sectional view of a novel tank according to the present invention for use with a cyclone aerator.

FIG. 8 illustrates a side cross-section view of a novel tank 200 for use with a cyclone aerator, such as shown in FIGS. 1–7, wherein the cyclone aerator 202 is submerged under a suspension pool 204 within the tank 200. A feed suspension 206 is delivered to the cyclone aerator 202 proximate an upper portion of the cyclone aerator 202. A first pressurized air stream 208 is delivered to the cyclone aerator 202 proximate the middle of the cyclone aerator 202. If the cyclone aerator 202 is of the design described in FIGS. 4–6., a second pressurized air stream 212 is delivered to the top of the cyclone aerator 202. An air/suspension mixture exits the bottom of the cyclone aerator 202 into the suspension pool 204. Preferably, the cyclone aerator 202 includes a flow director 214 at the bottom of the cyclone aerator 202 which deflects the air/suspension mixture in a more radial direction from the cyclone aerator 202. The angle of deflection 216 can range from 10 to 80 degrees and the size of the flow director is determined as about 0.5 to 2 times in diameter to a diameter of the cyclone aerator 202 and between about 1 and 6 inches tall.

The air/suspension mixture is directed out of the cyclone aerator 202 into different flow patterns that are controlled by the shape of the tank 200. The predominate shape of the tank 200 is determined by a first tank angle 222, a second tank angle 224, and a third tank angle 226, each of which can vary from 10 to 80 in degrees, depending upon the characteristics of the suspension to be treated.

As discussed above with regard to the cyclone aerator illustrated in FIGS. 1–7, particulates that are attached onto air bubbles (hereinafter "particulated air bubbles") are discharged out of the cyclone aerator, wherein the particulated air bubbles comprise between about 10 and 30% of the total suspension discharged from the cyclone aerator 202. As illustrated in FIG. 8, a portion of the particulated air bubbles are discharged from the cyclone aerator 202 into the suspension pool 204 and will rise to the top of the tank 200 along paths similar to a first flow pattern 228. A portion of the particulated air bubble will first contact a tank wall 232 and then rise to the top of the tank 200 along paths similar to a second flow pattern 234 and a third flow pattern 236. However, a majority of the discharged suspension (that which is free of bubbles, hereinafter "particulate-free portion of the suspension") will flow along paths similar to fourth flow pattern 238. The fourth flow pattern 238 will create fluid motion at the bottom portions of the tank 200 which results in "stirring-up" of particulates that were not attached to bubbles or became detached from bubbles and which have settled to the bottom portions of the tank 200. This "stirring-up" can result in secondary attachment to bubbles in the suspension pool 204 with results in improve particulate removal. The particulated air bubbles, after rising to the top of the tank 200, form what is known at the "froth product phase" 242. The froth product phase 242 can then be removed by any other conventional means, such as skimming, thereby removing the particulates.

The tank 200 also includes a discharge structure 244 attached to a tank wall 246, which is used for discharging the particulate-free portion of the suspension from the tank 200. The discharge structure 244 is essentially a substantially a rectangular box without the top cover. The sidewalls 248 of the discharge structure 244 are set at a sidewall angle 252 of between about 90 and 160 degrees. As shown in the FIG. 8, there are several parameters involved for the control of the size and position of the discharge structure 244. These parameters include the length of tank wall 246 ("tank wall length 254"), the length of the discharge structure 244 ("discharge structure length 256"), the height of the discharge structure 244 ("discharge structure height 258"), the distance from a lower edge of the discharge structure 244 to a bottom wall 262 of tank 200 ("lower distance 264"), and the distance for an upper edge of the discharge structure 244 to an upper sidewall 266 of tank 200 ("upper distance 268"). The ratio of the lower distance 264 to the tank wall length 254, the ratio of the discharge structure length 256 to the tank wall length 254, the ratio of the upper distance 268 to the tank wall length 254, and the ratio of the discharge structure height 258 to the tank wall length 254 should each be preferably between about 0.01 and 1.

Figure 9:
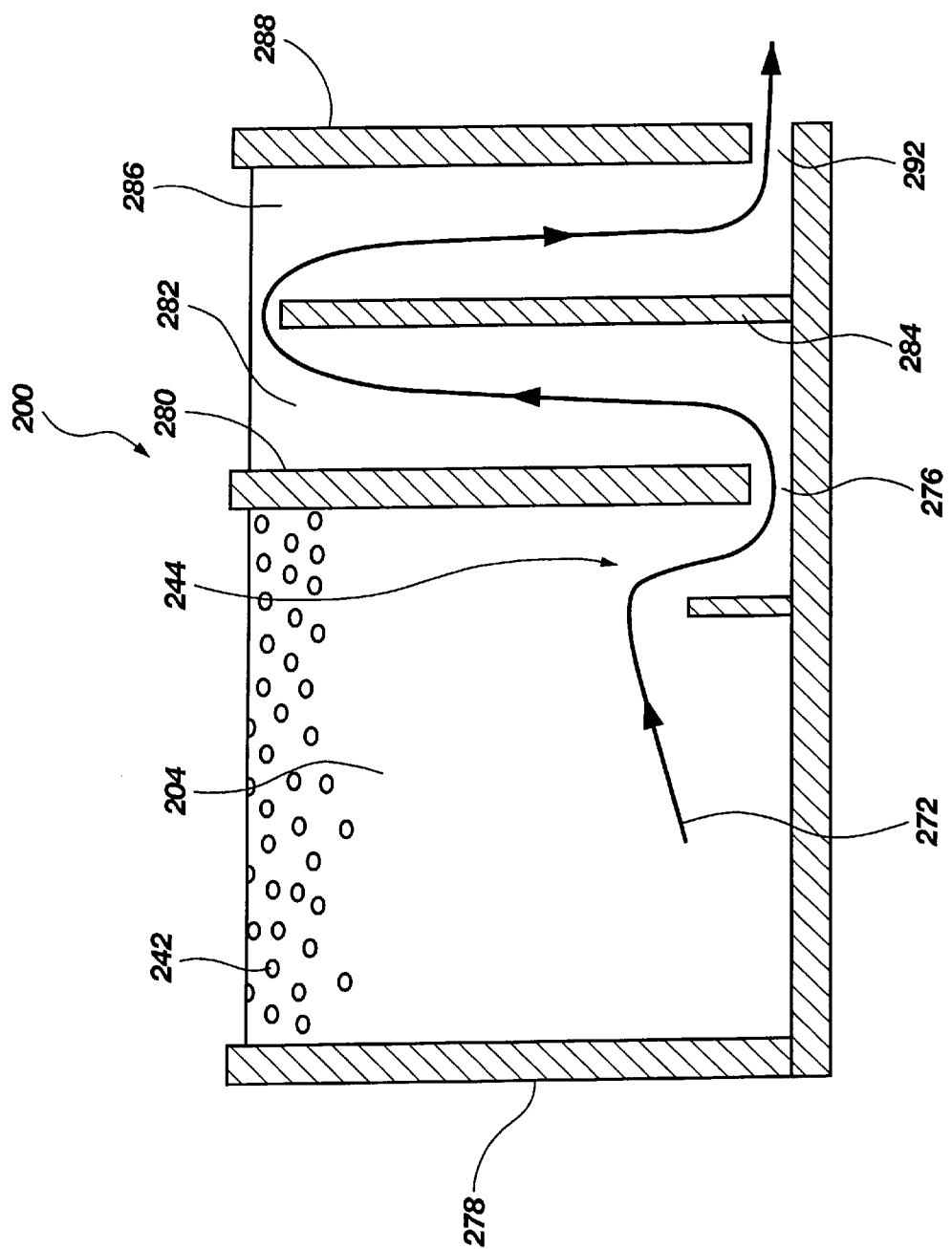
FIG. 9 is a cross-sectional view of the tank of FIG. 8 along line 9—9 according to the present invention.

As illustrated in FIG. 9, which is taken along line 9—9 of FIG. 8, the portion of the suspension (between first tank sidewall 278 and second tank sidewall 280) which is substantially free of particulates follows a flow path 272 through the discharge structure 244, through an opening 276 in the second tank sidewall 280, and into a first chamber 282, defined by the second tank sidewall 280 and a weir 284. From the first chamber 282, the particulate-free portion of the suspension flows over the weir 284 into a second chamber 286, defined by the weir 284 and an outside tank wall 288. From the second chamber 286, the particulate-free portion of the suspension can be either discharged through opening 292, or pumped out for the second stage processing, depending on the characteristics of the particulate-free portion of the suspension to be processed.

Preferably, the flow velocity of the particulate-free suspension is between about 0.01 and 10 cm/s which is achieved by proper selection of ratios of the lower distance 264 to the tank wall length 254, the discharge structure length 256 to the tank wall length 254, the upper distance 268 to the tank wall length 254, and the discharge structure height 258 to the tank wall length 254 with consideration of the flow rate of the feed suspension 206. Furthermore, the size of the first chamber 282 is defined such that velocity of the particulate-free portion of the suspension within the first chamber 282 is also between about 0.01 and 10 cm/s, by controlling the distance from the second tank sidewall 280 and the weir 284.

Figure 10:
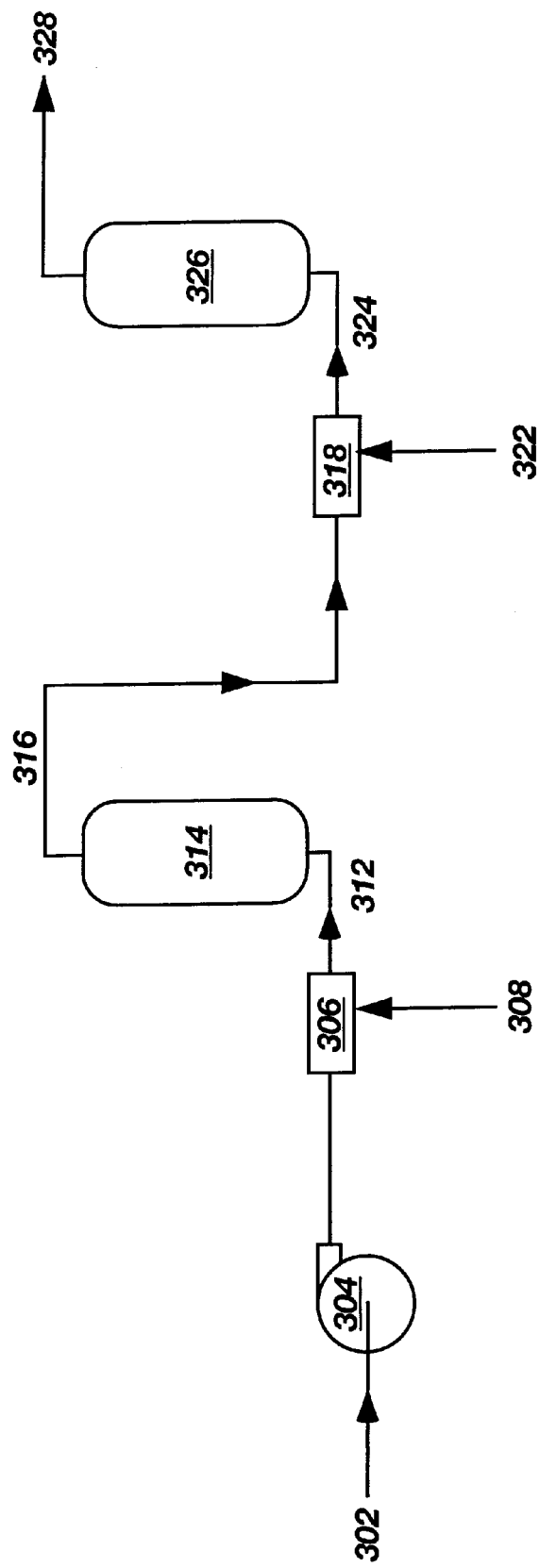
FIG. 10 is a schematic a system for introducing chemicals into a suspension according to the present invention.
Figure 11:
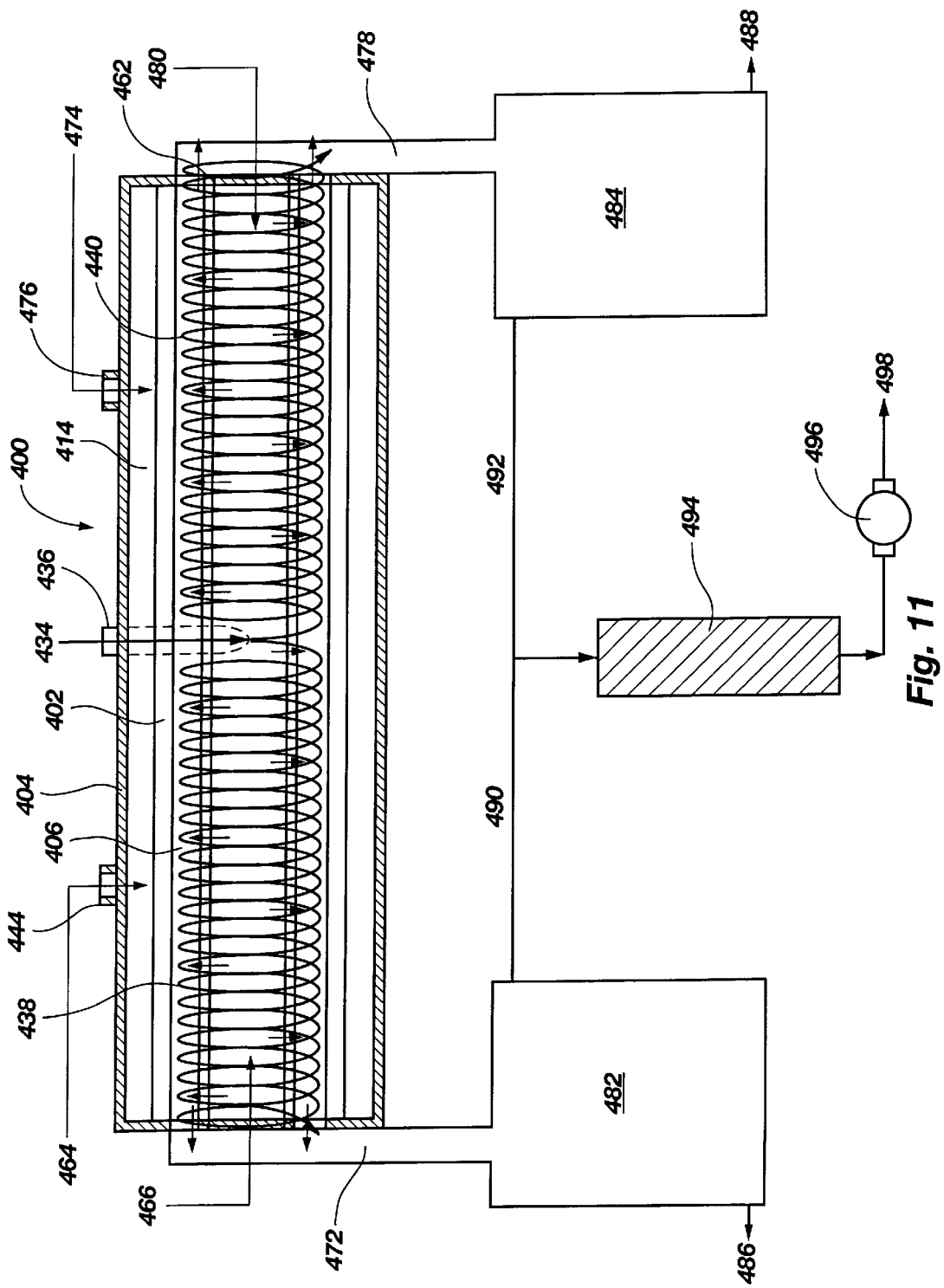
FIG. 11 is a cross-sectional view of a volatile organic compound stripping device according to the present invention.

In many wastewater treatment situations, chemicals are needed to render the particulates contained in the suspension hydrophobic so that they can be attached onto air bubbles generated in any separating devices, such as cyclone aerators 100, 160, and 180. FIG. 10 illustrates an apparatus for introduce such chemicals into a suspension. The untreated suspension 302 is pumped by pump 304 through and a first in-line mixer 306, wherein a first chemical 308 is introduced into the untreated suspension 302 to form a first treated suspension 312. The first treated suspension 312 then enters the bottom of a first conditioning tank 314. After the first treated suspension 312 has had sufficient time within the first conditioning tank 314 such that the untreated suspension 302 and first chemical 312 mix and react to form a first conditioned suspension 316, the first conditioned suspension 316 is drawn from the top of the first conditioning tank 314 and delivered to a second in-line mixer 318 wherein a second chemical 322 is introduced into the first conditioned suspension 316 to form a second treated suspension 324. The second treated suspension 324 then enters the bottom of a second conditioning tank 326. After the second treated suspension 312 has had sufficient time within the second conditioning tank 326 such that the first conditioned suspension 316 and the second chemical 322 mix and react to form a second conditioned suspension 328, the second conditioned suspension 328 is drawn from the top of the second conditioning tank 326 and delivered to a cyclone aerator, such as cyclone aerators 100, 160, or 180 illustrated in FIGS. 1–7.

Selection of first chemical 308 and second chemical 322 depends upon the surface properties and characteristics of the particulates and particles to be removed from the suspension, as known in the art. However, for wastewater treatment, applicable chemicals include metal coagulators, polymers, and other pH modifier For present invention, if the tank 200 illustrated in FIG. 8 has a volume X, the first conditioning tank 314 has a volume A, and the second conditioning tank 326 has a volume B, then, preferably the ratios of A to X and of B to X should be between about 0.1 and 10.

It is, of course, understood that a single chemical can be added to the suspension, and that plurality of chemicals can be adding in a plurality of in-line mixers and conditioning tanks. However, no matter how many chemical additions, it is preferred that the volume ratio of each conditioning tank to the tank 200 be between about 0.1 and 10.

FIG. 11 illustrates a volatile organic compound ("VOC") stripping device 400 comprising, essentially, two cyclone aerators such as cyclone aerators 100, 160, or 180 placed head to head in a horizontal position with a common suspension feed. In particular, the VOC stripping device 400 comprises a plurality of plates 402 disposed within a jacketing tube 404. The plurality of plates 402 in conjunction with the jacketing tube 404 define an annular cylindrical chamber 414 therebetween. The plurality of plates 402 also define a cylindrical chamber 406, substantially along a centerline of the VOC stripping device 400. A porous hollow cylinder 462 is disposed in the cylindrical chamber 406. The plurality of plates 402 are arranged in the distinct, non-radial fashion discussed above for FIGS. 1–6.

It is, of course, understood that the VOC stripping device 400 may be utilized without said porous hollow cylinder 462 or a solid-walled cylinder may be used in place of said porous hollow cylinder 462.

A suspension 434 is introduced into the cylindrical chamber 406 tangentially through a feed line 436 proximate a midpoint of said jacketing tube 404 to develop two swirling flow patterns 438, 440 of the suspension 434 within the cylindrical chamber 406 on the outside of the porous hollow cylinder 462, wherein flow patterns 438 and 440 travel in substantially opposite directions. A first flow of pressurized air 464 is introduced through a first air opening 444 in the jacketing tube 404 into the annular cylindrical chamber 414 proximate the midpoint between the feed line 436 and a first suspension discharge line 472. A second flow of pressurized air 474 is introduced through a second air opening 476 in the jacketing tube 404 into the annular cylindrical chamber 414 proximate the midpoint between the feed line 436 and a second suspension discharge line 478. The first and second flows of pressurized air 464, 474 travel into the cylindrical chamber 406 through the opening gaps (not shown) between the adjacent plates 402, as discussed above for FIGS. 1–6. When the first and second flows of pressurized air 464, 474 enter into the cylindrical chamber 406, they are sheared by the swirling flow patterns 438, 440 respectively, of the suspension 434 to form fine air bubbles. The formation of fine air bubbles in such a manner provides an optimal interfacial contact between the fine air bubbles and the suspension. This optimal interfacial contact significantly improves the mass transfer of any substance between the air and the suspension. In the case of VOCs, the VOC stripping device 400 creates a mass transfer of VOC from the suspension into the fine air bubble due to the chemical potential difference of a VOC between two phases.

A third flow of pressurized air 466 is introduced into porous hollow cylinder 462 proximate the first suspension discharge line 472. A fourth flow of pressurized air 480 is introduced into porous hollow cylinder 462 proximate the second suspension discharge line 478. The third and fourth flow of pressurized air 466, 480 pass through the porous hollow cylinder 462 into the swirling flow patterns 438, 440, respectively, of the suspension 434. As the third and fourth flow of pressurized air 466, 480 exits the porous hollow cylinder 462, they are also sheared into fine air bubbles by the swirling flow pattern 438, 440, respectively, of the suspension 434. The porous hollow cylinder 462 serves two purposes. First, the porous hollow cylinder 462 assists in maintain a more cohesive swirling flow patterns 438 and 440. Second, air bubbles generated from the porous hollow cylinder 462 will participate in the mass transfer of the VOCs out of the suspension into the fine air bubbles.

As a result of the intimate interaction between these numerous fine bubbles and the suspension, the VOCs in the water are stripped and transferred into the fine air bubbles. The air bubble volume to suspension volume ratio can vary from between about 10 and 100 depending on the volatility of the VOC to be stripped.

Referring again to FIG. 11, the first and second suspension discharge lines 472, 478 are connected to a first and second air/water separators 482, 484, respectively. The suspension which is now substantially free of VOCs is discharged out of the first and second air/water separators 482, 484 through first and second suspension discharge lines 486, 488, respectively. The air which is contains the VOCs is pumped out of the first and second air/water separators 482, 484 through first and second air discharge lines 490, 492, respectively, and through a carbon canister 494 by a vacuum pump 496. The carbon canister 494 removes the VOCs from the air before it is discharged to the atmosphere through clean air discharge line 498. If necessary, the suspension discharged from the air/water separators 482, 484 can be repeatedly reprocessed through the VOC stripping device 400 or through a series of VOC stripping devices to achieve a desired VOC removal.

It is understood that the cyclone aerators 100, 160, 180, and the VOC stripping device 400 each can be used to transfer gaseous chemicals from a gas to the suspension, thereby acting as diffusers or chemical reactors. For example, an oxidation gas can be introduced with or in lieu of the pressurized air which is introduced into these devices to create an appropriate mass transfer of the oxidation gas contained in air phase into the suspension phase. An oxidation gas such as ozone, which is very effective in destroying bacteria, viruses, and other organic materials in water, has not been widely utilized in industry because most of the ozone gas which is introduced into the water together with air, as the parent gas phase, cannot transfer into the water quickly. However, with the devices of the present invention, the generation of numerous fine air bubbles by the shear motion of the suspension creates for a large interfacial area between air and water for any given volume ratio between air and suspension. Thus, the mass transfer of the ozone from air into the water is significantly improved. This improved ozone uptake in the suspension by the utilization of the devices of the present invention can provide an effective disinfecting effect, while the reducing to a minimum the consumption of the ozone per volume of the water, as there is minimum waste of the ozone after air bubbles separate with the water phase.

EXAMPLES

The cyclone aerator utilized in the following examples had the configuration illustrated in FIGS. 1–3 and had the following dimensions:

A) Height of apparatus (148) (interior)-10 inches

B) Radius of apparatus (112) (interior)-1.875 inches

C) Plate Angle (118)-30 inches

D) Number of vanes-80

E) Width of vane-1 inch

Thickness of vane-$1/16$ inch

The tank utilized in the following examples had the configuration illustrated in FIGS. 8–9 and had the following dimensions with an overall tank height of 38 inches:

| | |
|---|---|
| upper sidewall (266) | 8 inches |
| third tank angle (226) | 60 degrees |
| discharge structure height (258) | 4 inches |
| upper distance (268) | 7 inches |
| discharge structure length (256) | 15 inches |
| lower distance (264) | 15 inches |
| second tank angle (224) | 45 degrees |
| discharge structure (244) | 15 inches |
| bottom wall (262) | 4 inches |
| tank wall (232) | 17 inches |
| first tank angle (222) | 45 degrees |
| second tank sidewall (280) | 36 inches |
| weir (284) | 34 inches |
| outside tank wall (288) | 36 inches |

The distance between the first tank sidewall (278) and the second tank sidewall (280) was 10 inches. The distance between the second tank sidewall (280) and the weir (284) was 2 inches. The distance between the weir (284) and the outside tank wall (288) was 4 inches.

It is, of course, understood that the cyclone aerator can be of any size depending on the application. However, the standard applications for such a cyclone aerator will usually fall within the following ranges:

A) Height of apparatus-10"–60"

B) Radius of apparatus-1"–20"

C) Plate Angle-1°–88°

(see FIG. 6-angle between a radial line from the center line 108 and the planar position of each of the plurality of plates 102)

D) Number of plates-40–1000

E) Width of plates 2"–5"

Thickness of plates-$1/128$–$1/8$"

Example 1

A wastewater stream generated from a meat processing plant was treated with the cyclone aerator and tank described above to remove FOG, TSS, BOD, and COD therefrom. The wastewater was first conditioned with a cationic polymer, PERCOL 728, Allied Colloids, Inc., Bradford, U.K. (to render that particulates in the wastewater hydrophobic) at a rate to supply 8 parts per million in the wastewater. After conditioning, the wastewater was processed through the cyclone aerator at 15 gallons per minute while the pressurize air introduced into the system, using a volumetric ratio of air to wastewater, was controlled at 0.1:1. It is noted that for the cyclone aerator described the volumetric ratio is preferably in a range from between about 0.01:1 and 5:1. The results from this processing are listed below in Table 1:

TABLE 1

| | Source Water (parts per million) | Discharge (parts per million) | Percent Removal (%) |
|---|---|---|---|
| TTS | 2000 | 100 | 95 |
| FOG | 2870 | 1 | 100 |
| BOD | 1180 | 270 | 77 |
| COD | 4390 | 310 | 93 |

The operational cost, including power (for pumps and air) and cationic polymer, is estimated at between about $0.4 and $0.6 per 1,000 gallons of wastewater processed.

Example 2

A wastewater stream generated from a bakery plant was treated with the cyclone aerator and tank described above to remove TSS, BOD, and O&G therefrom. The wastewater was first conditioned with a cationic polymer, PERCOL 728, Allied Colloids, Inc., Bradford, U.K., (to render that particulates in the wastewater hydrophobic) at a rate to supply 25 parts per million in the wastewater. After conditioning, the wastewater was processed through the cyclone aerator at 20 gallons per minute while the pressurize air introduced into the system, using a volumetric ratio of air to wastewater, was controlled at 0.1:1. The results from this processing are listed below in Table 2:

TABLE 2

| | Source Water (parts per million) | Discharge (parts per million) | Percent Removal (%) |
|---|---|---|---|
| TTS | 874 | 16 | 98 |
| BOD | 2140 | <673 | >69 |
| O&G | 194 | <6 | >97 |

The operational cost, including power (for pump and air) and cationic polymer, is estimated at between about $0.60 and $0.80 per 1,000 gallons of wastewater processed.

Example 3

Two different wastewater streams containing petrolium oil and fuels, as well as TSS, was treated with the cyclone aerator and tank described above. The wastewater was first conditioned with a cationic metal ion (ferric irons in the form of ferric chlorine, as supplier by Hi-Valley Chemical, Salt Lake City, Utah) at a rate to supply 40 parts per million in the wastewater to control the surface charge potential between the surface of the air bubbles and the oil/fuel droplet surface. The wastewater was then conditioned with a cationic polymer (PERCOL 728, Allied Colloids, Inc., Bradford, U.K.) (to render that particulates in the wastewater hydrophobic) at a rate to supply 15 parts per million in the wastewater. After conditioning, the wastewater was processed through the cyclone aerator at between about 10 and 20 gallons per minute while the pressurize air introduced into the system, using a volumetric ratio of air to wastewater, was controlled at 0.1:1. The results from the first wastewater stream processing are listed below in Table 3A and the results from the second wastewater stream processing are listed in Table 3B:

TABLE 3A

|  | Source Water (parts per million) | Discharge (parts per million) | Percent Removal (%) |
| --- | --- | --- | --- |
| TSS | 30 | <5 | >83 |
| O&G | 1790 | not detectable | 100 |
| TPH* | 1840 | not detectable | 100 |

*TPH -- total petroleum hydrocarbon

TABLE 3B

|  | Source Water (parts per million) | Discharge (parts per million) | Percent Removal (%) |
| --- | --- | --- | --- |
| TSS | 540 | 4 | 99 |
| O&G | 5250 | 31 | 99 |

The operational cost, including power (for pump and air) and conditioning chemicals, is estimated at between about $0.34 and $0.44 per 1,000 gallons of wastewater processed.

Example 4

A wastewater stream generated from dye bath operations in a textile fabrication facility was treated with the cyclone aerator and tank described above to remove dyes and particulates. Textile fabrication facilities generally produce two types of wastewater. The first type is from screen printing (printing dyes and other materials onto limited areas of fabrics). The second type is from dye bath operation (immersing fabrics in a dye bath). Most materials and dyes involved in screen printing are hydrophobic in nature and can be relatively easily removed from wastewater by various known flotation technologies. However, material and dyes involved in dye bath operations consist of both hydrophobic and hydrophilic material so that intimate and uniform adsorption of dyes on fabrics can be achieved. The wastewater generated the dye bath operation is difficult to process and clean.

Figure 12:
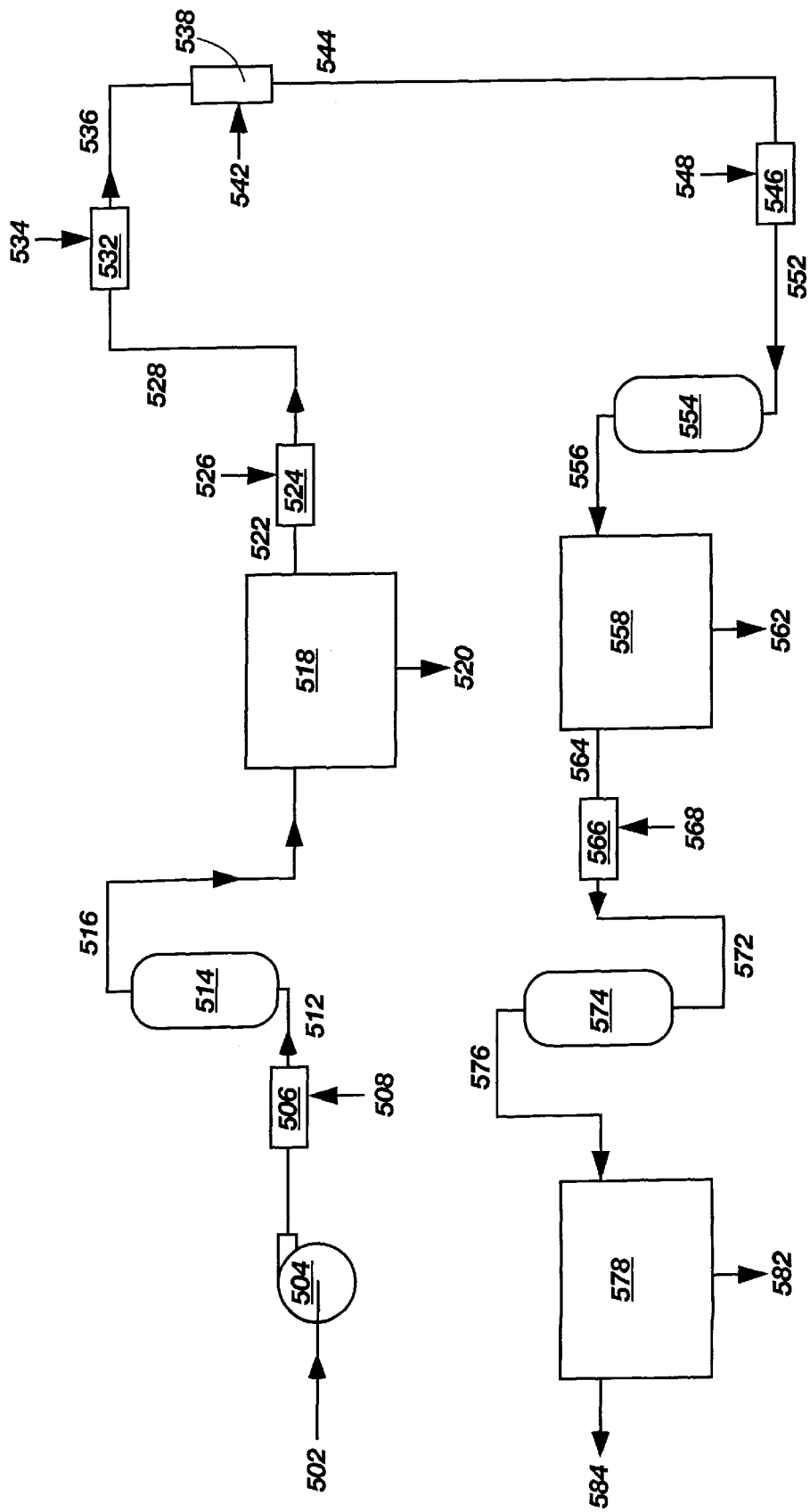
FIG. 12 is a schematic of a treatment system for removing dye from a wastewater according to the present invention.

FIG. 12 illustrates a process flowsheet for the treatment of dye bath wastewater 502. The dye bath wastewater is pumped by a pump 504 to a first in-line mixer 506 where a cationic polymer 508, preferably PERCOL 728, Allied Colloids, Inc., Bradford, U.K., (to render that particulates in the wastewater hydrophobic) at a dosage of between about 1 and 50 ppm of the dye bath wastewater 502 is added into the dye bath wastewater 502 to form a treated wastewater stream 512. The first treated wastewater stream 512 then enters the bottom of a first conditioning tank 514. After the first treated wastewater stream 512 has had sufficient time within the first conditioning tank 514 such that the dye bath wastewater 502 and cationic polymer 508 mix and react to form a first conditioned wastewater 516, the first conditioned wastewater 516 is drawn from the top of the first conditioning tank 514 and delivered to a first aerating system 518 comprising the cyclone aerator and the tank discussed above. Dyes and other materials that are naturally hydrophobic are removed from the first conditioned wastewater 516 as first waste stream 520 forming a first cleaned wastewater 522. The first cleaned wastewater 522 is delivered to a second in-line mixer 524 where an acid 526, preferably hydrochloric acid, is added to lower the pH value of the first cleaned wastewater 522 to a range of between about 3 and 6 (to alter particle surface charge), depending upon the economics of the process as well as properties of the first cleaned wastewater 522, to form an acidified wastewater 528. After acid addition, the acidified wastewater 528 is sent to a third in-line mixer 532 where cationic irons 534, such as ferric chloride at a dosage of between about 10 and 100 ppm, is added to the acidified wastewater 528 to form a cationic wastewater 536 (cationic irons control the surface charge potential between the surface of the air bubbles and the materials and dyes). The cationic wastewater 536 is sent to a fourth in-line mixer 538 where a surface modifier 542 to render particles hydrophobic, such as sodium dodecyl sulfonate (Pilot Chemical Co., Santa Fe Springs, Calif.) at a dosage of between about 10 and 200 ppm, is added to the cationic wastewater 536 to form a surface modified wastewater 544. The surface modified wastewater 544 is sent to a fifth in-line mixer 546 where a polymer 548, such as PERCOL 728, Allied Colloids, Inc., Bradford, U.K., at a dosage of between about 1 and 50 ppm is added to the surface modified wastewater 544 for better particulate floation which forms a polymer treated wastewater 552.

The polymer treated wastewater 552 then enters the bottom of a second conditioning tank 554. After the polymer treated wastewater 552 has had sufficient time within the second conditioning tank 554 such that the surface modified wastewater 544 and the polymer 548 mix and react to form a second conditioned wastewater 556, the second conditioned wastewater 556 is drawn from the top of the second conditioning tank 556 and delivered to a second aerating system 558 comprising the cyclone aerator of FIGS. 4–6 and the tank of FIG. 8. Dyes and other materials which have been rendered hydrophobic by previous treatment step are removed from the second conditioned wastewater 556 as second waste stream 562 forming a second cleaned wastewater 564.

The second cleaned wastewater 564 is sent to a sixth in-line mixer 566 where a caustic 568, preferably lime, is added to raise the pH value of the second cleaned wastewater 564 to a range of between about 8 and 12, depending upon the economics of the process as well as properties of the second cleaned wastewater 564, to form a caustic treated wastewater 572 to aid precipitations and flocculation. The caustic treated wastewater 572 then enters the bottom of a third conditioning tank 574. After the caustic treated wastewater 572 has had sufficient time within the third conditioning tank 574 such that the second cleaned wastewater 564 and the caustic 568 mix and react to form a third conditioned wastewater 576, the third conditioned wastewater 576 is drawn from the top of the third conditioning tank 574 and delivered to third aerating system 578 comprising the cyclone aerator of FIGS. 4–6 and the tank of FIG. 8. Dissolved solids in the third conditioned wastewater 576 are removed in the third aerating system 578 as third waste stream 582 forming a clear water stream 584.

For each of the first aerator system 518, the second aerator system 558, and the third aerator system 578, the total air introduced into the system, using a volumetric ratio of air to water, was controlled at 0.2:1. However, for current invention, this ratio is preferred in a range from between about 0.01:1 and 5:1.

Conductivities of the water before and after process were measured. This is a general method to determine whether the clear water stream 584 discharged from the third aerator system 578 can be reused. If the conductivity in the clear water stream 584 is high, the total dissolved solids in the clear water stream 584 may be too high for the clear water stream 584 to be reused. The results from the wastewater processing are listed below in Table 4.

TABLE 4

|  | Wastewater | Clear Water |
| --- | --- | --- |
| Conductivity | 7.6 k$\mu$s | 6.2 k$\mu$s |

Measured results illustrate that the clear water stream 584 can be reused in dye bath operations. Indeed, a portion of the clear water stream 584 processed has been sent to a dye bath plant and bench test dyeing has been conducted which shows that the clear water stream 584 can be reused for dying without addition of the salt.

This process, by combining using the current invented device together with such specific invented process steps, provide significant advantages in both removal efficiency as well as operational costs as compared with other technologies available today in the market. The operational cost including power and chemicals is calculated at between about $1.50 and $2.50 per 1,000 gallons of wastewater processed.

Example 5

Another wastewater stream generated from dye bath operations in a textile fabrication facility was treated with the cyclone aerator and tank described above to remove dyes and particulates. In this example, the wastewater was first conditioned (as described above) by CaO at dosage of between about 100 and 2000 ppm of the wastewater. A cationic polymer, PERCOL 728, Allied Colloids, Inc., Bradford, U.K., is added to render that particulates in the wastewater hydrophobic at a dosage of between about 1 and 20 ppm of the wastewater, and a fatty acid (Pilot Chemicals, Inc., Santa Fe Spring, Calif.) added to also render the particles hydrophobic at a dosage of between about 100 and 500 ppm of the wastewater. After appropriate conditioning time, the conditioned wastewater was introduced into an aerating system comprising the cyclone aerator of FIGS. 4–6 and the tank of FIG. 8. Air was also introduced into the aerating system, using a volumetric ratio of air to water, at 0.1:1. Dyes and other materials were removed and separated from the wastewater in the aerating system to form a clear water stream. The results from the wastewater processing are listed below in Table 5.

TABLE 5

|  | Wastewater | Clear Water |
| --- | --- | --- |
| pH | 8.8 | 11.0 |
| Conductivity | 7.6 kus | 6.2 kus |

The operational cost is calculated at between about $1.00 and $2.00 per 1,000 gallons of wastewater processed.

The process illustrated in Example 5 has a lower operational cost as compared with Example 4. However, it has a higher pH value. Therefore, the clear water from this example may be discharged, reused as washing water, or used as a portion of dye bath water after blending with a given portion of fresh water.

It is known that fatty acids are very difficult to dissolve in water. Thus, it appears impossible to as a fatty acid into the wastewater stream, as discussed above. However, it has been found that blending a powdered fatty acid, Pilot Chemical, Inc., Santa Fe Springs, Calif., into a liquid, nonionic polymer, preferably PERCOL 777, Allied Colloids, Inc., Bardford, U.K., with a molecular weight of between about 0.25 millions and 5 millions forms an emulsion. This emulsion is readily soluble in water, thereby allowing in-line addition of the fatty acid into the system for processing of dye bath wastewater.

Example 6

The present invention has also been tested for the removal of VOCs from a water stream. In the present example, benzene was used as the containing VOC. Benzene was selected because it has a relatively low Henry's constant which makes benzene relatively difficult to strip, as compared with other VOCs, from a water stream. Thus, if the benzene can be stripped efficiently by the present invention, a majority of other VOCs can also be stripped efficiently.

The test apparatus for the present example is illustrated and described above for FIG. 11 at a flow rate of 10 gallons per minute with an air:water volume ratio at 90. The results from the processing of benzene contaminated stream at three varying concentrations are listed below in Table 6.

TABLE 6

|  | Concentration (parts per million) | Percent Removal | Power Cost Per Thousand Gallons |
| --- | --- | --- | --- |
| Source Water 1 | 10 |  |  |
| Discharge 1 | <0.02 | >99% | $0.20–$0.40 |
| Source Water 2 | 100 |  |  |
| Discharge 2 | 0.2 | >99% | $0.20–$0.40 |
| Source Water 3 | 500 |  |  |
| Discharge 3 | 1.0 | >99% | $0.20–$0.40 |

Based on test results for benzene removal at a given removal efficiency of greater than 99%, the power cost per every 1,000 gallons of water processed is at between about $0.20 and $0.40. This cost versus removal efficiency is independent of initial concentration of the VOC in water.

Having thus described in detail preferred embodiments of the present invention, it is to be understood that the invention defined by the appended claims is not to be limited by particular details set forth in the above description as many apparent variations thereof are possible without departing from the spirit or scope thereof.

What is claimed is:

1. A cyclone aerator, comprising:
   a substantially longitudinally oriented, hollow vessel having a substantially cylindrical configuration;
   plates longitudinally positioned within said hollow vessel to extend in a spaced relationship to the hollow vessel to form a peripheral space, said plates extending partially towards a center of said hollow vessel to firm a substantially cylindrical central void, said plates positioned adjacent to and spaced from one another and positioned in said hollow vessel in a non-radial orientation;

an inlet proximate an upper end of said hollow vessel for introducing a fluid suspension into said central void in a generally tangential fashion to create a circular flow in said central void;

a gas inlet in said hollow vessel to introduce a gas into said peripheral space wherein said gas flows through said plates to admix with said fluid suspension; and an outlet proximate a lower end of said hollow vessel for purging said fluid suspension and said gas admixed with said fluid suspension.

2. The cyclone aerator of claim 1 further including a solid-walled cylinder positioned proximate a center of said central void.

3. The cyclone aerator of claim 1 further including a porous hollow cylinder positioned proximate a center of said central void, said porous hollow cylinder having a central void; and a second gas inlet to introduce a second gas into said hollow cylinder central void wherein said second gas travels through said porous hollow cylinder to admix with said fluid suspension.

4. The cyclone aerator of claim 3 wherein said porous hollow cylinder comprises a material selected from the group consisting of porous stainless steel, ceramic material, and polyethylene.

5. The cyclone aerator of claim 3 wherein said porous hollow cylinder includes pores sizes between about 5 and 250 microns.

6. The cyclone aerator of claim 1, further comprising a gas source providing an oxidant gas, said gas source removably connected to said gas inlet.

7. The cyclone aerator of claim 6 wherein said oxidant gas comprises ozone.

8. The cyclone aerator of claim 1 wherein the number of plates is determined by the equation:

$$N=C/((T/(2^*\cos\alpha))+G)$$

wherein N is the number of plates, T is the thickness of each of said plates, $\alpha$ is an angle between a radial line from a center of said hollow vessel and a planar position of each of said plates, G is the gap between any two of said plates, and C is the quantity $2^*\pi^*R2$ wherein R2 is the desired radius from a center point of said hollow vessel to an external edge of said plates and is determined by the equation:

$$R2=(Lp^*\sin\alpha^*(L-1))/(Lp^*\sin\alpha-L^*\tan\alpha)$$

wherein Lp is the plate width, L is the difference between the distance between a center point of said cylindrically shaped chamber to an external edge of any of said plates and the radius of said hollow vessel, and $\alpha$ is an angle between a radial line from said center of said hollow vessel and said planar position of each of said plates.

9. A cyclone aerator, comprising:

a jacket tube, said jacket tube defining an interior space;

a top cover removably attached to said jacket tube, said top cover including a plurality of top flanges;

a bottom cover removably attached to said jacket tube, said bottom cover including a plurality of bottom flanges, said plurality of bottom flanges correspondingly aligned with said plurality of top flanges;

a plurality of removable plates oriented within said interior space of said jacket tube, each of said plurality of plates in orientation with at least one of said plurality of top flanges and at least one of said correspondingly aligned bottom flanges;

a gas inlet in communication with said jacket tube whereby a gas may be introduced into at least a portion of said interior space of said jacket tube;

a fluidized suspension feed inlet in communication with said jacket tube including means to create a swirling flow pattern in said fluidized suspension whereby said fluidized suspension may be introduced into at least a portion of said interior space of said jacket tube; and a discharge outlet in communication with said jacket tube whereby said gas and said fluidized suspension may be purged from at least a portion of said interior space of said jacket tube.

10. The cyclone aerator of claim 9 wherein said plurality of removable plates extend from an internal edge of each of said plurality of plates towards said jacket tube from a central position in said interior space to extend in a non-radial fashion to an external edge of said plurality of plates whereby said plurality of plates are at an angle to one another.

11. The cyclone aerator of claim 9 wherein said feed inlet is proximate said top cover.

12. The cyclone aerator of claim 9 wherein said feed inlet is an integral portion of said top cover.

13. The cyclone aerator of claim 9 wherein said discharge outlet is proximate said bottom cover.

14. The cyclone aerator of claim 9 wherein said discharge outlet is an integral portion of said bottom cover.

15. A cyclone aerator, comprising:

a substantially longitudinally oriented jacketing tube, said jacketing tube having a first open end and a second open end at opposing ends of said jacketing tube;

a top removably connected to said first open end of said jacketing tube, said top including top flanges;

a bottom removably connected to said second open end of said jacketing tube, said bottom including bottom flanges, wherein said bottom flanges are substantially aligned with said top flanges;

a plurality of plates, said plurality of plates longitudinally disposed within said jacketing tube, each of said plurality of plates substantially rectangular in shape having an internal edge and an external edge, each of said plurality of plates extending in a non-radial manner from said internal edge disposed proximate a longitudinal centerline of said jacketing tube to said external edge disposed proximate said jacketing tube, said internal edges of said plurality of plates defining a substantially cylindrical central chamber oriented around said longitudinal centerline of said jacketing tube, said external edges of said plurality of plates and said jacketing tube defining an outer chamber;

a feed inlet, said feed inlet proximate said top whereby a fluidized suspension may be introduced into said substantially cylindrical central chamber of said jacketing tube in a tangential fashion about said longitudinal centerline of said jacketing tube;

a gas inlet, said gas inlet proximate a midpoint of said jacketing tube whereby a gas may be introduced into said outer chamber, said gas passing between said plurality of plates to said central chamber; and an outlet, said outlet located proximate said bottom, said outlet in communication with said central chamber whereby said fluidized suspension and said gas exit said central chamber.

* * * * *